(12) United States Patent
Zhang

(10) Patent No.: US 12,475,279 B2
(45) Date of Patent: Nov. 18, 2025

(54) PERFORMANCE OPTIMIZATION METHOD AND RELATED DEVICE

(71) Applicant: Huawei Technologies Co., Ltd., Shenzhen (CN)

(72) Inventor: Ming Zhang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 77 days.

(21) Appl. No.: 18/564,403

(22) PCT Filed: Mar. 29, 2022

(86) PCT No.: PCT/CN2022/083760

§ 371 (c)(1),
(2) Date: Nov. 27, 2023

(87) PCT Pub. No.: WO2022/247446

PCT Pub. Date: Dec. 1, 2022

(65) Prior Publication Data

US 2024/0249041 A1    Jul. 25, 2024

(30) Foreign Application Priority Data

May 28, 2021 (CN) .......................... 202110590183.7

(51) Int. Cl.
*G06F 11/00* (2006.01)
*A63F 13/355* (2014.01)
(Continued)

(52) U.S. Cl.
CPC ............ *G06F 30/20* (2020.01); *A63F 13/355* (2014.09); *A63F 13/48* (2014.09); *A63F 13/77* (2014.09); *G06F 11/0772* (2013.01)

(58) Field of Classification Search
CPC .... A63F 13/77; G06F 11/0772; G06F 11/142; G06F 11/36
See application file for complete search history.

(56) References Cited

U.S. PATENT DOCUMENTS 6,370,496 B1 * 4/2002 Carlson ............... G06F 11/3698
714/E11.21
7,475,235 B1 * 1/2009 Bernardy ............ G06F 9/44505
713/1
(Continued)

FOREIGN PATENT DOCUMENTS

CN      106131300 A    11/2016
CN      107807852 A    3/2018
(Continued)

*Primary Examiner* — Philip Guyton
(74) *Attorney, Agent, or Firm* — Conley Rose, P.C.

(57) ABSTRACT

A method includes a server that receives first running data from a plurality of terminals determines a first configuration parameter based on a first model, identification information of a first application, and first running data, and sends the first configuration parameter to a first terminal, where the first running data includes running data generated when the plurality of terminals run a first scene of the first application, and models of the plurality of terminals and the first terminal are a first model. The first terminal receives the first configuration parameter from the server, determines the first scene during running of the first application, and runs the first scene of the first application based on the first configuration parameter.

20 Claims, 11 Drawing Sheets

(51) Int. Cl.
    *A63F 13/48*       (2014.01)
    *A63F 13/77*       (2014.01)
    *G06F 11/07*       (2006.01)
    *G06F 30/20*       (2020.01)

(56) References Cited

U.S. PATENT DOCUMENTS

| | | | | |
|---|---|---|---|---|
| 7,685,412 | B1* | 3/2010 | Burdick | G06F 9/44505 |
| | | | | 713/1 |
| 10,951,331 | B1 | 3/2021 | Chisu et al. | |
| 11,099,957 | B2* | 8/2021 | Kirita | H04L 43/50 |
| 2003/0237017 | A1* | 12/2003 | Jibbe | G06F 11/0751 |
| | | | | 714/4.2 |
| 2004/0255185 | A1* | 12/2004 | Fujiyama | G06F 11/1482 |
| | | | | 714/E11.008 |
| 2006/0184917 | A1* | 8/2006 | Troan | G06F 11/3688 |
| | | | | 717/124 |
| 2011/0119473 | A1* | 5/2011 | Hyvonen | G06F 11/3051 |
| | | | | 713/1 |
| 2014/0143605 | A1* | 5/2014 | Balla | G06F 9/44505 |
| | | | | 714/38.1 |
| 2014/0372801 | A1* | 12/2014 | Graham | G06F 9/44505 |
| | | | | 714/21 |

FOREIGN PATENT DOCUMENTS

| | | | |
|---|---|---|---|
| CN | 108536461 | A | 9/2018 |
| CN | 109814933 | A | 5/2019 |
| CN | 111176758 | A | 5/2020 |
| CN | 113127188 | A | 7/2021 |
| WO | 2015172367 | A1 | 11/2015 |

* cited by examiner

PERFORMANCE OPTIMIZATION METHOD AND RELATED DEVICE

CROSS-REFERENCE TO RELATED APPLICATIONS

This is a U.S. National Stage of International Patent Application No. PCT/CN2022/083760 filed on Mar. 29, 2022, which claims priority to Chinese Patent Application No. 202110590183.7 filed on May 28, 2021. Both of the aforementioned applications are hereby incorporated by reference in their entireties.

TECHNICAL FIELD

This application relates to the field of artificial intelligence technologies, and in particular, to a performance optimization method and a related device.

BACKGROUND

Currently, an electronic device has increasingly powerful functions, and more applications are installed on the electronic device. A game application is used as an example. As game image quality is improved, game playing methods and game scenes are enriched, a higher requirement is imposed on performance of the electronic device.

Hardware chips of different electronic devices have different designs. Different hardware chips support algorithms and interfaces in different ways. As a result, performance of the same game on different electronic devices is different. For example, if a game application cannot properly use a hardware resource of the electronic device, or a scheduling policy implemented by the game application conflicts with a system configuration policy preset by the electronic device, or a system of the electronic device determines that a system is current abnormal (for example, a temperature of a terminal is abnormal) and triggers a management and control policy (for example, frequency reduction of hardware) of the electronic device, game frame freezing occurs, game performance is reduced, and user experience is affected.

SUMMARY

An objective of this application is to provide a performance optimization method and a related device. The method is used to improve game performance.

According to a first aspect, this application provides a performance optimization method for a terminal. The method specifically includes: A server receives first running data from a plurality of terminals, where the first running data includes running data generated when the plurality of terminals run a first scene of a first application, and models of the plurality of terminals are a first model. The server determines a first configuration parameter based on the first model, identification information of the first application, and the first running data, where the first configuration parameter is used by a terminal of the first model to perform parameter configuration on the terminal when the terminal runs the first scene of the first application. The server sends the first configuration parameter to a first terminal, where a model of the first terminal is the first model. The first terminal receives the first configuration parameter from the server, where the first configuration parameter includes a configuration parameter corresponding to the first scene of the first application. The first terminal determines the first scene during running of the first application, and runs the first scene of the first application based on the first configuration parameter.

The first configuration parameter may include identification information of the first scene and one or more of the following parameters corresponding to the identification information of the first scene: a running frequency of a central processing unit CPU, a running frequency of a graphics processing unit GPU, quantities of big cores and small cores of the CPU, a GPU size, a highest temperature for triggering a temperature control policy, or a network speed priority.

According to the foregoing technical solution, the server may recommend, for a same model, a same application, and a same scene, a configuration parameter used for performance optimization. In a process of running the first application, a terminal may run the first scene of the first application based on the configuration parameter recommended by the server, so that performance optimization can be performed on the first application, to improve user experience.

For example, the first application is a game application. When the terminal runs a scene 1 of a game application, a game interface freezes due to insufficient cache, and the terminal has available GPU resources. In this case, the first configuration parameter sent by the server to the terminal may include a GPU size, for example, a 4M GPU cache. In this way, the terminal runs the scene 1 of the game application based on the first configuration parameter, so that the frame freezing caused by insufficient cache can be avoided, and hardware resources of the terminal can be properly used.

For another example, when the terminal runs a scene 2 of the game application, a scheduling policy implemented by the game application is that there are four CPU big cores and four CPU small cores, but a system of the terminal configures two CPU big cores and two CPU small cores for the game application. As a result, the scheduling policy implemented by the game application conflicts with the system configured policy, and game experience deteriorates. In this case, the first configuration parameter sent by the server to the terminal may include quantities (for example, four) of CPU big cores and CPU small cores. In this way, the terminal runs the scene 2 of the game application based on the first configuration parameter, a conflict between the scheduling policy implemented by the game application and the system configured policy can be avoided.

For another example, when the terminal runs a scene 3 of the game application, if a housing temperature of the terminal is higher than a highest temperature (for example, 43° C.) of a temperature control policy but does not reach 50° C., the temperature control policy is triggered, for example, the game application is forcibly closed or a running frequency of hardware (for example, the CPU or the GPU) is reduced. In this case, the first configuration parameter sent by the server to the terminal may include the highest temperature for triggering the temperature control policy. For example, the highest temperature rises from original 43° C. to 50° C. In this way, when the terminal runs the scene 3 of the game application based on the first configuration parameter, the terminal housing temperature is greater than 43° C. but less than 50° C., and the temperature control policy is not triggered, to improve game experience.

In a possible design, the first scene is a high-load scene in a running process of the first application.

In a possible design, the first application is a game application.

In a possible design, before the server sends the first configuration parameter to the first terminal, the method may further include: The server performs verification on the first configuration parameter, and determines that the verification on the first configuration parameter succeeds.

According to the foregoing design, the server may perform verification on the first configuration parameter, to ensure that the first configuration parameter can effectively optimize performance in the first scene of the first application run by the terminal of the first model.

In a possible design, the method may further include: The first terminal performs verification on the first configuration parameter; and if the verification on the first configuration parameter fails, the first terminal runs the first scene of the first application based on a second configuration parameter; or if the verification on the first configuration parameter succeeds, the first terminal continues running the first scene of the first application based on the first configuration parameter. Further, when the verification on the first configuration parameter fails, the first terminal may send an exception message to the server.

Optionally, the second configuration parameter may be a configuration parameter currently locally stored in the first terminal. For example, the second configuration parameter may be a default configuration parameter of the first terminal before delivery, or a configuration parameter recommended by the server last time, or a configuration parameter obtained after a system version of the first terminal is updated, or a configuration parameter obtained after a version of the first application is updated, or the like. This is not limited in this embodiment of this application.

According to the foregoing design, the first terminal may perform verification on the first configuration parameter when running the first scene of the first application based on the first configuration parameter, to ensure that the first configuration parameter can effectively optimize performance in the first scene of the first application run by the first terminal, to avoid negative optimization and the like caused by individual differences between electronic devices of a same model.

In a possible design, before the server sends the first configuration parameter to the first terminal, the method may further include: The first terminal sends a first request message to the server, where the first request message includes the first model and the identification information of the first application, and the first request message is used to request to obtain the first configuration parameter. The server receives the first request message from the first terminal.

According to the foregoing technical solution, the terminal may actively obtain a configuration parameter by sending a request message to the server. For example, when starting the first application, the terminal may send the first request message to the server, to run the first scene of the first application based on a latest configuration parameter.

In a possible design, before the first terminal receives the first configuration parameter from the server, the method may further include: The first terminal runs the first scene of the first application based on the second configuration parameter. The first terminal obtains second running data, where the second running data includes running data generated when the first terminal runs the first scene of the first application based on the second configuration parameter, and the first running data includes the second running data. The first terminal sends the second running data to the server.

According to the foregoing technical solution, the first terminal may report running data in a high-load scene to the server, so that the server can collect a large amount of running data corresponding to a same scene of a same model and a same application. Further, the server may recommend, to the terminal of the first model based on the large amount of running data, a configuration parameter used when the terminal runs the first scene of the first application.

In a possible design, the first running data may include the first model, the identification information of the first application, a scene parameter, and a performance parameter. The scene parameter includes one or more of the following parameters: a first scene entry/exit identifier, a scene type, or instance data. The performance parameter includes one or more of the following parameters: rendering duration of the first frame, an average frame rate, a jitter rate, a low frame rate ratio, power consumption, a device housing temperature, or a quantity of lost frames.

According to a second aspect, this application provides a performance optimization method for a terminal. The method may be applied to a first terminal, and a model of the first terminal is a first model. The method may specifically include: receiving, by the first terminal, a first configuration parameter from a server, where the first configuration parameter is used by a terminal of the first model to perform parameter configuration on the terminal when the terminal runs a first scene of a first application, the first configuration parameter is determined by the server based on the first model, identification information of the first application, and first running data, the first running data includes running data generated when a plurality of terminals run the first scene of the first application, and models of the plurality of terminals are the first model; determining the first scene during running of the first application; and running the first scene of the first application based on the first configuration parameter.

In a possible design, the first scene is a high-load scene in a running process of the first application.

In a possible design, the first application is a game application.

In a possible design, the method may further include: performing verification on the first configuration parameter; and if the verification on the first configuration parameter fails, running the first scene of the first application based on a second configuration parameter; or if the verification on the first configuration parameter succeeds, continuing running the first scene of the first application based on the first configuration parameter. Further, when the verification on the first configuration parameter fails, the first terminal may send an exception message to the server.

In a possible design, the performing verification on the first configuration parameter may be: collecting a first performance parameter generated during running of the first scene of the first application based on the first configuration parameter; and performing verification on the first configuration parameter based on a second performance parameter and the first performance parameter, where the second performance parameter is a performance parameter generated when the first terminal runs the first scene of the first application based on the second configuration parameter.

According to the foregoing technical solution, the first terminal may determine, by comparing the performance parameter corresponding to the first configuration parameter with the performance parameter corresponding to the second configuration parameter in a same scene, whether the first configuration parameter effectively optimizes performance in the first scene of the first application. For example, if the first terminal determines that effective optimization is performed, that is, the verification succeeds, the first terminal may continue running the first scene of the first application based on the first configuration parameter: otherwise, the first terminal may run the first application based on the second configuration parameter. In this way, it can be ensured that performance in the first scene of the first application is properly optimized, negative optimization can be avoided, and user experience can be improved.

In a possible design, before the receiving a first configuration parameter from a server, the method may further include: running, by the first terminal, the first scene of the first application based on the second configuration parameter; obtaining second running data, where the second running data includes running data that is generated when the first terminal runs the first scene of the first application based on the second configuration parameter; and sending the second running data to the server.

In a possible design, before the receiving a first configuration parameter from a server, the method further includes: sending, by the first terminal, a first request message to the server, where the first request message includes the first model and the identification information of the first application, and the first request message is used to request to obtain the first configuration parameter.

In a possible design, the first configuration parameter includes identification information of the first scene and one or more of the following parameters corresponding to the identification information of the first scene: a running frequency of a central processing unit CPU, a running frequency of a graphics processing unit GPU, quantities of big cores and small cores of the CPU, a GPU size, a highest temperature for triggering a temperature control policy, or a network speed priority.

In a possible design, the first running data may include the first model, the identification information of the first application, a scene parameter, and a performance parameter. The scene parameter includes one or more of the following parameters: a first scene entry/exit identifier, a scene type, or instance data. The performance parameter includes one or more of the following parameters: rendering duration of the first frame, an average frame rate, a jitter rate, a low frame rate ratio, power consumption, a device housing temperature, or a quantity of lost frames.

According to a third aspect, this application provides a performance optimization method. The method may be applied to a server. The method may specifically include: receiving, by the server, first running data from a plurality of terminals, where the first running data includes running data of the plurality of terminals for running a first scene of a first application, and models of the plurality of terminals are a first model; determining a first configuration parameter based on the first model, identification information of the first application, and the first running data, where the first configuration parameter is used by a terminal of the first model to perform parameter configuration on the terminal when the terminal runs the first scene of the first application; and sending the first configuration parameter to a first terminal, where a model of the first terminal is the first model.

In a possible design, the first scene is a high-load scene in a running process of the first application.

In a possible design, the first application is a game application.

In a possible design, before the sending the first configuration parameter to a first terminal, the method may further include: performing verification on the first configuration parameter, and determining that the verification on the first configuration parameter succeeds.

In a possible design, the performing verification on the first configuration parameter may be: running the first scene of the first application based on the first configuration parameter by simulating a terminal of the first model; collecting a third performance parameter generated during running of the first scene of the first application based on the first configuration parameter; and performing verification on the first configuration parameter based on a fourth performance parameter and the third performance parameter, where the fourth performance parameter is a performance parameter generated during running of the first scene of the first application based on a third configuration parameter.

In a possible design, before the sending the first configuration parameter to a first terminal, the method may further include: The server receives a first request message from the first terminal, where the first request message includes the first model and identification information of the first application, and the first request message is used to request to obtain the first configuration parameter.

In a possible design, the determining a first configuration parameter based on the first running data may be: training a first parameter recommendation model based on the first model, the identification information of the first application, and the first running data; and obtaining the first configuration parameter based on the first model, the identification information of the first application, and the first parameter recommendation model.

In a possible design, the first configuration parameter includes identification information of the first scene and one or more of the following parameters corresponding to the identification information of the first scene: a running frequency of a central processing unit CPU, a running frequency of a graphics processing unit GPU, quantities of big cores and small cores of the CPU, a GPU size, a highest temperature for triggering a temperature control policy, or a network speed priority.

In a possible design, the first running data may include the first model, the identification information of the first application, a scene parameter, and a performance parameter. The scene parameter includes one or more of the following parameters: a first scene entry/exit identifier, a scene type, or instance data. The performance parameter includes one or more of the following parameters: rendering duration of the first frame, an average frame rate, a jitter rate, a low frame rate ratio, power consumption, a device housing temperature, or a quantity of lost frames.

According to a fourth aspect, this application provides a communication apparatus. The communication apparatus may include modules/units that perform the method according to any one of the second aspect or the possible designs of the second aspect. These modules/units may be implemented by hardware, or may be implemented by hardware executing corresponding software. For example, the communication apparatus may include a processing module and a transceiver module. The processing module is configured to perform the method according to any one of the second aspect or the possible designs of the second aspect. The transceiver module is configured to implement data and/or signaling interaction between the communication apparatus and another apparatus, for example, receive a first configuration parameter from a server.

According to a fifth aspect, this application provides a communication apparatus. The communication apparatus may include modules/units that perform the method according to any one of the third aspect or the possible designs of the third aspect. These modules/units may be implemented by hardware, or may be implemented by hardware executing corresponding software. For example, the communication apparatus may include a processing module and a transceiver module. The processing module is configured to perform the method according to any one of the third aspect or the possible designs of the third aspect. The transceiver module is configured to implement data and/or signaling interaction between the communication apparatus and another apparatus, for example, send a first configuration parameter to a first terminal.

According to a sixth aspect, this application provides a communication apparatus. The communication apparatus may include one or more processors and a memory. The memory is configured to store one or more computer programs, the one or more computer programs include instructions, and when the instructions are executed by the communication apparatus, the communication apparatus is enabled to perform the method according to any one of the second aspect or the possible designs of the second aspect.

According to a seventh aspect, this application provides a communication apparatus. The communication apparatus may include one or more processors and a memory. The memory is configured to store one or more computer programs, the one or more computer programs include instructions, and when the instructions are executed by the communication apparatus, the communication apparatus is enabled to perform the method according to any one of the third aspect or the possible designs of the third aspect.

According to an eighth aspect, this application provides a chip. The chip may be coupled to a memory in a communication apparatus, so that when the chip is run, program instructions stored in the memory are invoked, to implement the method according to any one of the second aspect or the possible designs of the second aspect.

According to a ninth aspect, this application provides a chip. The chip may be coupled to a memory in a communication apparatus, so that when the chip is run, program instructions stored in the memory are invoked, to implement the method according to any one of the third aspect or the possible designs of the third aspect.

According to a tenth aspect, this application provides a communication system, including the communication apparatus according to any one of the fourth aspect or the possible designs of the fourth aspect and the communication apparatus according to any one of the fifth aspect or the possible designs of the fifth aspect, or including the communication apparatus according to any one of the sixth aspect or the possible designs of the sixth aspect and the communication apparatus according to any one of the seventh aspect or the possible designs of the seventh aspect, or including the chip according to any one of the eighth aspect or the possible designs of the eighth aspect and the chip according to any one of the ninth aspect or the possible designs of the ninth aspect.

According to an eleventh aspect, this application provides a computer-readable storage medium. The computer-readable storage medium includes a computer program, and when the computer program is run on a communication apparatus, the communication apparatus is enabled to perform the method according to any one of the second aspect or the possible designs of the second aspect.

According to a twelfth aspect, this application provides a computer-readable storage medium. The computer-readable storage medium includes a computer program, and when the computer program is run on a communication apparatus, the communication apparatus is enabled to perform the method according to any one of the third aspect or the possible designs of the third aspect.

According to a thirteenth aspect, this application provides a computer program product, including instructions. When the instructions are run on a computer, the computer is enabled to perform the method according to any one of the second aspect or the possible designs of the second aspect.

According to a fourteenth aspect, this application provides a computer program product, including instructions. When the instructions are run on a computer, the computer is enabled to perform the method according to any one of the third aspect or the possible designs of the third aspect.

According to a fifteenth aspect, this application further provides an electronic device. The electronic device includes one or more processors, one or more memories, one or more sensors, a plurality of applications, and one or more computer programs. The one or more computer programs are stored in the one or more memories. The one or more computer programs include instructions, and when the instructions are invoked and executed by the one or more processors, the electronic device is enabled to perform the technical solution in any one of the second aspect or the possible designs of the second aspect.

For each aspect of the second aspect to the fifteenth aspect and technical effects that may be achieved in each aspect, refer to the description of technical effects that can be achieved in the possible solutions of the first aspect. Details are not described herein again.

DESCRIPTION OF EMBODIMENTS

Figure 1:
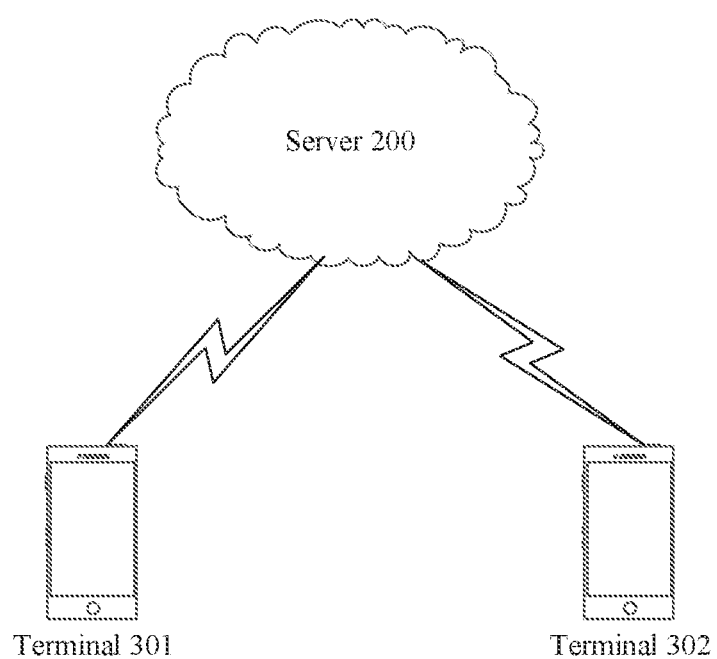
FIG. 1 is a schematic diagram of an application scenario to which an embodiment of this application is applicable.

First, some terms in embodiments of this application are first explained and described, so that a person skilled in the art can easily understand the terms.

(1) An open beta test phase is a phase in which a provider of a game application invites a plurality of users to experience the game application before the game application is released (or after the game application is updated but updated content is not released), and then debugs the game application based on game running data generated when the plurality of users experience the game application.

An official release phase is a phase in which a user actively experiences a game application after the game application is released (or after the game application is updated and updated content is released).

(2) An application (application, APP) in embodiments of this application may be referred to as an application for short, and is a software program that can implement one or more specific functions. Generally, a plurality of applications may be installed on a terminal, for example, an instant messaging application, a video application, an audio application, an image shooting application, and the like. The instant messaging application may include, for example, a "Messages" application, WeChat (WeChat), WhatsApp Messenger, Line (Line). Instagram (instagram), Kakao Talk, DingTalk, and the like. The image shooting application may include, for example, a camera application (a system camera or a third-party camera application). The video application may include, for example, YouTube, Twitter, TikTok, iQIYI, Tencent Video, and the like. The audio application may include, for example, KuGou, EMUMO, QQ music, and the like. The application in the following embodiments may be an application installed on the terminal before delivery, or may be an application downloaded by a user from a network or obtained by the user from another terminal in a process of using the terminal.

It should be noted that a performance optimization method provided in embodiments of this application may be applied to the foregoing game application, another application, or the like. This is not limited in embodiments of this application. The following uses the game application as an example for description. A first application in this application may be referred to as a first game application. Correspondingly, in the following, first running data may be referred to as first game running data, and second running data may be referred to as second game running data.

(3) A terminal in embodiments of this application may also be referred to as an electronic device, a terminal device, or the like. The name is not limited in this application. For example, the terminal may be a mobile phone (mobile phone), a tablet computer, a notebook computer, a palmtop computer, a mobile internet device (mobile internet device, MID), a wearable device (for example, a watch, a wristband, a smart helmet, or the like), a virtual reality (virtual reality, VR) device, an augmented reality (augmented reality, AR) device, an ultra-mobile personal computer (ultra-mobile personal computer, UMPC), a netbook, a personal digital assistant (personal digital assistant, PDA), a wireless electronic device in industrial control (industrial control), a wireless electronic device in self driving (self driving), a wireless electronic device in remote medical surgery (remote medical surgery), a wireless electronic device in smart grid (smart grid), a wireless electronic device in transportation safety (transportation safety), a wireless electronic device in smart city (smart city), a wireless electronic device in smart home (smart home), and the like.

(4) A server in embodiments of this application may also be referred to as a big data platform, a cloud, a cloud server, a server cluster, or the like. The name is not limited in this application. However, this does not constitute a limitation, and another server that can be used for big data computing may also be used.

(5) The terms used in embodiments of this application are merely for the purpose of describing specific embodiments, but are not intended to limit this application. The terms "one", "a", "the", and "this" of singular forms used in this specification and the appended claims of this application are also intended to include expressions such as "one or more", unless otherwise specified in the context clearly. It should be further understood that, in embodiments of this application, "one or more" refers to one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

Reference to "an embodiment". "some embodiments", or the like described in this specification indicates that one or more embodiments of this application include a specific feature, structure, or characteristic described with reference to the embodiments. Therefore, statements such as "in an embodiment". "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise" "have", and their variants all mean "include but are not limited to", unless otherwise specifically emphasized in another manner.

In embodiments of this application, "at least one" means one or more, and "a plurality of" means two or more. In addition, it should be understood that in description of this application, terms such as "first" and "second" are merely used for distinguishing and description, but should not be understood as indicating or implying relative importance, or should not be understood as indicating or implying a sequence.

FIG. 1 is a schematic diagram of an example scenario of a performance optimization method according to an embodiment of this application. As shown in FIG. 1, the scenario may include a communication system of a server 200 and one or more terminals (a terminal 301 and a terminal 302 are used as an example in the figure). After the server 200 establishes a connection to the terminal, the server 200 may provide a network service for the terminal. For details about the server and terminal, refer to the foregoing description. For example, one or more APPs may be installed on the terminal. In a running process of an APP, information is exchanged between the terminal and the server 200. The information may be an APP-related configuration parameter recommended by the server 200 for the terminal, and/or APP running-related status information reported by the terminal to the server 200.

A game application is used as an example, and the game application is installed on the terminal. In response to a start operation of a user (for example, clicking or touching an icon of the game application displayed on a display interface of the terminal), the terminal starts the game application. When the game application is run on the terminal, the terminal may collect game running data. The game running data includes, for example, one or more of a high-load scene entry/exit identifier, a scene type, instance data, rendering duration of the first frame, an average frame rate in a time period of a high-load scene, a jitter rate, a frame freezing count, a low frame rate ratio, power consumption, a device housing temperature, a quantity of lost frames, or the like.

After collecting the game running data, the terminal may send the game running data to the corresponding server 200, for example, the server 200 that establishes a connection to the terminal. The server 200 may be a server provided by a game application agent, for example, a server corresponding to Tencent games, or certainly, may be another server, for example, a server corresponding to a mobile phone supplier. This is not limited in this application. The server 200 may determine a configuration parameter based on the game running data. The configuration parameter is a software resource, a hardware resource, or a software resource and a hardware resource recommended by the server 200.

For example, the server 200 maintains a large amount of game running data. The large amount of game running data is generated when different game applications are run on terminals of different models. The server 200 may store game running data of different game applications by using identifiers of the game applications as indexes. For ease of understanding, Table 1 shows an example of game running data that exists in the server 200. Table 1 uses the Knives Out and the Arena of Valor as an example to show that game running data generated when a same game application is run on a terminal in different scenes is different, game running data generated when different game applications are run on terminals of a same model is different, and game running data generated when a same game application is run on terminals of different models is different.

TABLE 1

| Game name | Model information of a terminal | Scene identification information | Game running data |
|---|---|---|---|
| Knives Out | Model 1 | Scene 1 | Game running data 1 |
| | | Scene 2 | Game running data 2 |
| | | Scene 3 | Game running data 3 |
| | Model 2 | Scene 1 | Game running data 4 |
| Arena of Valor | Model 2 | Scene 4 | Game running data 5 |
| | | Scene 5 | Game running data 6 |
| | Model 3 | Scene 6 | Game running data 7 |

For another example, the server 200 may generate a training sample based on the game running data, and train parameter recommendation models corresponding to different game applications, different models, and different scenes. The server 200 maintains parameter recommendation models corresponding to different game applications, different models, and different scenes. The parameter recommendation model is used to recommend, for one or more scenes in a running process of a game application on the terminal, an available hardware resource, an available software resource, or an available hardware resource and an available software resource for the game application. For example, the server 200 stores these parameter recommendation models by using an identifier of the game application as an index. For ease of understanding, Table 2 shoes an example of parameter recommendation models maintained by the server 200. Table 2 shows parameter recommendation models corresponding to different game applications, different models, and different scenes by using the Knives Out and the Arena of Valor as an example.

TABLE 2

| Game name | Model information of a terminal | Scene identification information | Parameter recommendation model |
|---|---|---|---|
| Knives Out | Model 1 | Scene 1 | Model 1 |
| | | Scene 2 | Model 2 |
| | | Scene 3 | Model 3 |

TABLE 2-continued

| Game name | Model information of a terminal | Scene identification information | Parameter recommendation model |
|---|---|---|---|
| | Model 2 | Scene 1 | Model 4 |
| Arena of Valor | Model 2 | Scene 4 | Model 5 |
| | | Scene 5 | Model 6 |
| | Model 3 | Scene 6 | Model 7 |

In conclusion, the server 200 may recommend, for the terminal based on the game running data reported by the terminal, a hardware resource and/or a software resource that can be used to configure a game application.

It should be noted that, the server 200 and the terminal may be interconnected through a communication network. The communications network may be a local area network, or may be a wide area network connected by using a relay (relay) device. For example, when the communication network is a local area network, the communication network may be a short-range communication network such as a Wi-Fi hotspot network, a Wi-Fi P2P network, a Bluetooth network, a ZigBee network, a near field communication (near field communication, NFC) network, or the like. When the communication network is a wide area network, for example, the communication network may be a third generation mobile communication technology (the 3rd-generation wireless telephone technology, 3G) network, a fourth generation mobile communication technology (the 4th generation mobile communication technology, 4G) network, a fifth generation mobile communication technology (the 5th-generation mobile communication technology, 5G) network, a future evolved public land mobile network (public land mobile network, PLMN), the internet, or the like. In the scenario shown in FIG. 1, different electronic devices may exchange data through the communication network. For example, the terminal sends a scene parameter and a performance parameter to the server 200. The server 200 sends a configuration parameter and the like to the terminal.

The following separately describes the server 200 and the terminal by using examples.

Figure 2A:
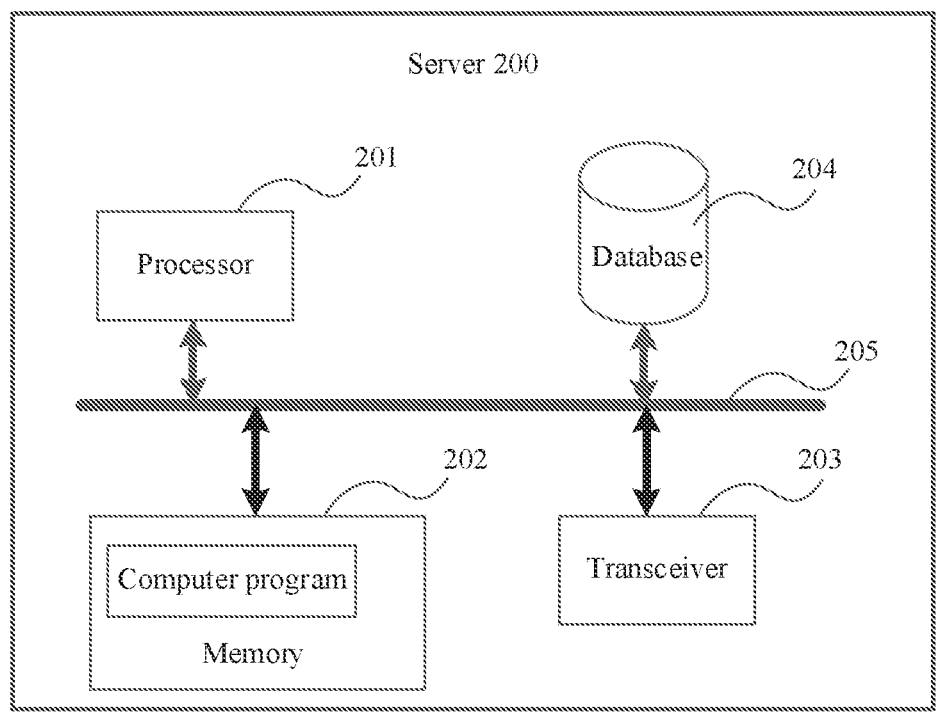
FIG. 2A is a schematic diagram of a structure of a server according to an embodiment of this application.

1. Server 200:

FIG. 2A is a block diagram of a partial structure of the server 200 related to embodiments of this application. The server 200 is, for example, a single server, a server cluster, a cloud server, or the like, and is configured to recommend, for the terminal based on game running data reported by the terminal, a hardware resource and/or a software resource that can be used by a game application. As shown in FIG. 2A, the server 200 may include a processor 201, a memory 202, and a transceiver 203. The one or more computer programs are stored in the memory 202 and are configured to be executed by the one or more processors 201.

The processor 201 may be a central processing unit (central processing unit, CPU), a digital processing unit, or the like. The processor 201 may be a control center of the server 200. The processor 201 is connected to various parts of the entire server 200 through various interfaces and lines. By running or executing a computer program stored in the memory 202 and invoking historical game running data that is related to the game application and that is stored in the memory 202, the processor 201 performs various functions related to the game application, for example, determining a configuration parameter based on a historical game running parameter, performing verification on the determined configuration parameter, and the like.

The transceiver 203 may be configured to: receive historical game running data that is related to the game application and that is collected by the terminal, and send a configuration parameter processed by the processor 201 to the terminal and the like.

For example, the server 200 may further include a database 204. The database 204 may be configured to store a large quantity of compressed APP files, for example, game running data related to each game application shown in Table 1, and a parameter recommendation model related to each game application shown in Table 2.

In embodiments of this application, a specific connection medium between the processor 201, the memory 202, the processor 201, the database 204, and the like is not limited. In embodiments of this application, the processor 210, the memory 202, the transceiver 203, and the database 204 are connected through a bus 205 in FIG. 2A. The bus is represented by a thick line in FIG. 2A. A connection manner between other components is merely an example for description, and is not limited thereto. The bus may be classified into an address bus, a data bus, a control bus, and the like. For ease of representation, only one thick line is used to represent the bus in FIG. 2A, but this does not mean that there is only one bus or only one type of bus.

The memory 202 may be a volatile memory (volatile memory) such as a random access memory (random-access memory, RAM). Alternatively, the memory 202 may be a non-volatile memory (non-volatile memory) such as a read-only memory, a flash memory (flash memory), a hard disk drive (hard disk drive, HDD), or a solid-state drive (solid-state drive, SSD). Alternatively, the memory 202 is any other medium that can be used to carry or store expected program code in a form of an instruction or a data structure and can be accessed by a computer. The memory 202 may be a combination of the foregoing memories.

Figure 2B:
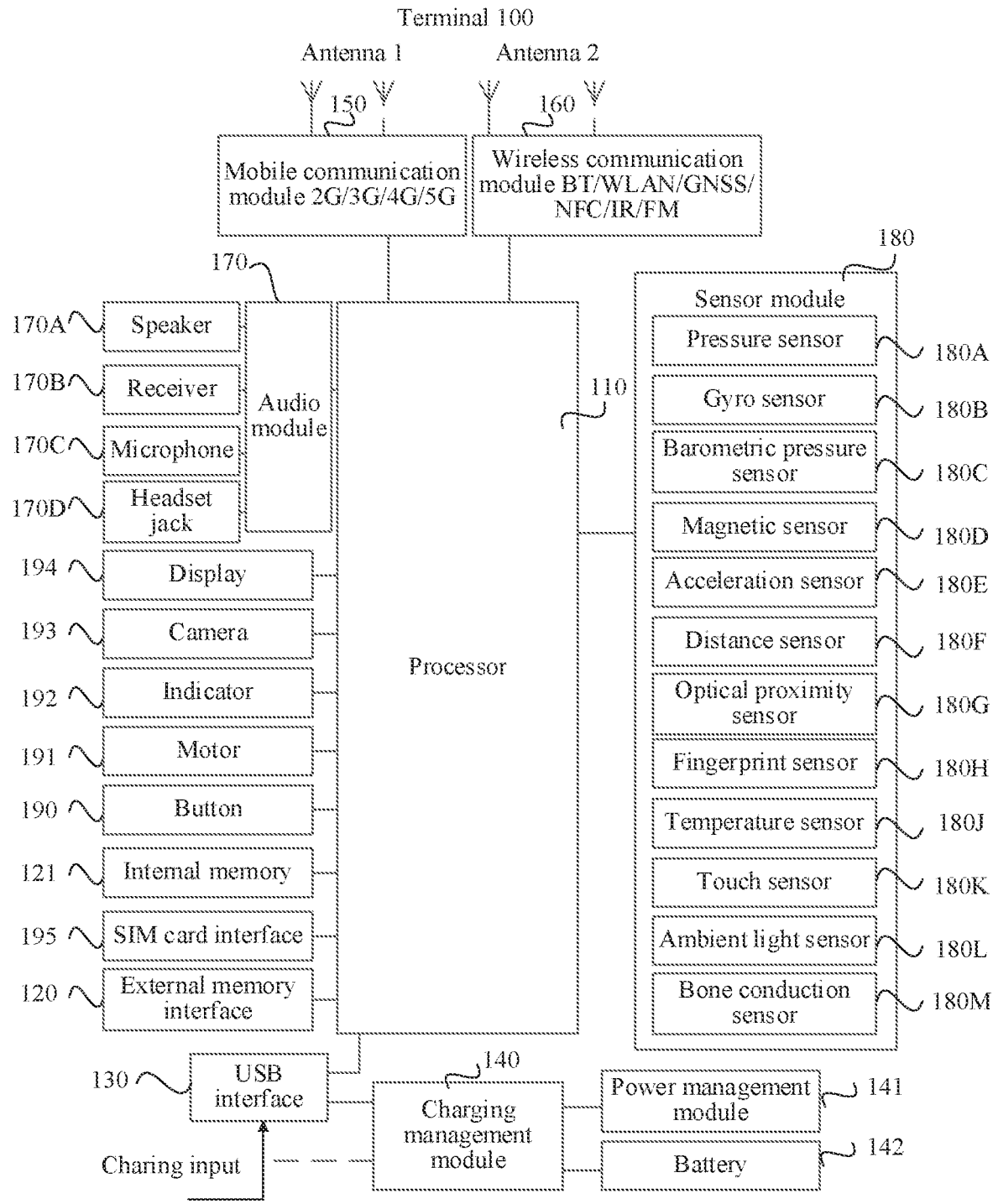
FIG. 2B is a schematic diagram of a structure of a terminal according to an embodiment of this application.

2. Terminal:

FIG. 2B is a schematic diagram of a structure of a terminal. For example, the terminal is the terminal in the architecture shown in FIG. 1. The terminal may be a mobile phone, a tablet computer, or the like. As shown in FIG. 2B, the terminal may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the terminal 100. The controller may generate an operation control signal based on an instruction operation code and a time sequence signal, to complete control of instruction reading and instruction execution. A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

The USB interface 130 is an interface that conforms to a USB standard specification, and may be specifically a mini USB interface, a micro USB interface, a USB type-C interface, or the like. The USB interface 130 may be configured to connect to a charger to charge the terminal, or may be used to transfer data between the terminal and a peripheral device. The charging management module 140 is configured to receive a charging input from the charger. The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like.

A wireless communication function of the terminal may be implemented by using the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna in the terminal may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the terminal and that includes 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform filtering, amplification, or the like on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The wireless communication module 160 may provide a solution, applied to the terminal, to wireless communication including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 may be one or more components integrating at least one communications processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal, the antenna 1 is coupled to the mobile communication module 150, and the antenna 2 is coupled to the wireless communication module 160, so that the terminal can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The display 194 is configured to display a display interface of an application, for example, a game interface of a game application and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the terminal may include one or N displays 194, where N is a positive integer greater than 1.

The terminal may implement a photographing function by using the camera 193, the ISP, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure, a color temperature, and the like of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as RGB, YUV, or the like. In some embodiments, the terminal may include one or N cameras 193, where N is a positive integer greater than 1.

The digital signal processor is configured to process a digital signal, and may process another digital signal in addition to the digital image signal. For example, when the terminal selects a frequency, the digital signal processor is configured to perform Fourier transformation and the like on frequency energy.

The video codec is configured to compress or decompress a digital video. The terminal may support one or more video codecs. In this way, the terminal may play or record videos in various encoding formats, such as moving picture experts group (moving picture experts group, MPEG)-1, MPEG-2, MPEG-3, MPEG-4, and the like.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition and the like of the terminal may be implemented by the NPU, for example, image recognition, facial recognition, speech recognition, text understanding, and the like.

The internal memory 121 may be configured to store computer-executable program code. The executable program code includes instructions. The processor 110 runs the instruction stored in the internal memory 121, to implement various function applications and data processing of the terminal. The internal memory 121 may include a program storage area and a data storage area. The program storage area may store an operating system, software code of at least one application (for example, iQIYI, WeChat, or the like), and the like. The data storage area may store data (for example, a shot image, a recorded video, or the like) generated in a process of using the terminal, and the like. In addition, the internal memory 121 may include a high-speed random access memory, or may include a nonvolatile memory, for example, at least one magnetic disk storage device, a flash memory, a universal flash storage (universal flash storage, UFS), or the like.

The external memory interface 120 may be used to connect to an external storage card, for example, a micro SD card, to extend a storage capability of the terminal. The external memory card communicates with the processor 110 through the external memory interface 120, to implement a data storage function. For example, files such as images, videos, or the like are stored in the external storage card.

The terminal may implement an audio function, for example, music playing, recording, and the like through the audio module 170, the speaker 170A, the receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion gesture of the terminal. In some embodiments, an angular velocity of the terminal around three axes (namely, axes x, y, and z) may be determined by using the gyro sensor 180B.

The gyro sensor 180B may be configured to implement image stabilization during photographing. The barometric pressure sensor 180C is configured to measure barometric pressure. In some embodiments, the terminal calculates an altitude through the barometric pressure measured by the barometric pressure sensor 180C, to assist in positioning and navigation. The magnetic sensor 180D includes a Hall sensor. The terminal may detect opening and closing of a flip cover by using the magnetic sensor 180D. In some embodiments, when the terminal is a flip phone, the terminal may detect opening and closing of a flip cover based on the magnetic sensor 180D. Further, a feature such as automatic unlocking upon opening of the flip cover and the like is set based on a detected opening or closing state of the flip cover. The acceleration sensor 180E may detect accelerations in various directions (usually on three axes) of the terminal. When the terminal is still, a magnitude and a direction of gravity may be detected. The acceleration sensor 180E may be further configured to identify a posture of the terminal, and is applied to an application such as switching between a landscape mode and a portrait mode or a pedometer.

The distance sensor 180F is configured to measure a distance. The terminal may measure the distance in an infrared manner or a laser manner. In some embodiments, in a photographing scenario, the terminal may measure a distance through the distance sensor 180F to implement quick focusing. The optical proximity sensor 180G may include, for example, a light emitting diode (LED) and an optical detector, for example, a photodiode. The light emitting diode may be an infrared light emitting diode. The terminal emits infrared light through the light-emitting diode. The terminal detects infrared reflected light from a nearby object by using the photodiode. When sufficient reflected light is detected, the terminal may determine that there is an object near the terminal. When insufficient reflected light is detected, the terminal may determine that there is no object near the terminal. The terminal may detect, by using the optical proximity sensor 180G, that the user holds the terminal close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The terminal may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the terminal is in a pocket, to avoid an accidental touch. The fingerprint sensor 180H is configured to collect a fingerprint. The terminal may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal executes a temperature processing policy by using the temperature detected by the temperature sensor 180J. For example, when the temperature reported by the temperature sensor 180J exceeds a threshold, the terminal lowers performance of a processor nearby the temperature sensor 180J, to reduce power consumption for thermal protection. In some other embodiments, when the temperature is lower than another threshold, the terminal heats the battery 142 to prevent the terminal from being shut down abnormally due to a low temperature. In some other embodiments, when the temperature is lower than still another threshold, the terminal boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided by using the display 194. In some other embodiments, the touch sensor 180K may also be disposed on a surface of the terminal at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, or may be a touch button. The terminal may receive a button input to generate a button signal input related to user setting and function control of the terminal. The motor 191 may generate a vibration prompt. The motor 191 may be configured to provide an incoming call vibration prompt and a touch vibration feedback. For example, touch operations performed on different applications (for example, photographing, audio playback, and the like) may correspond to different vibration feedback effects. A touch vibration feedback effect may be further customized. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or detached from the SIM card interface 195, to implement contact with or separation from the terminal.

It may be understood that the components shown in FIG. 2B do not constitute a specific limitation on the terminal. The terminal may further include more or fewer components than those shown in the figure, or some components may be combined, or some components may be divided, or there may be different component arrangements. In addition, a combination/connection relationship between the components in FIG. 2B may also be adjusted and modified.

In this embodiment of this application, an Android (Android) system with a layered architecture is used as an example to describe a software structure of the terminal.

Figure 2C:
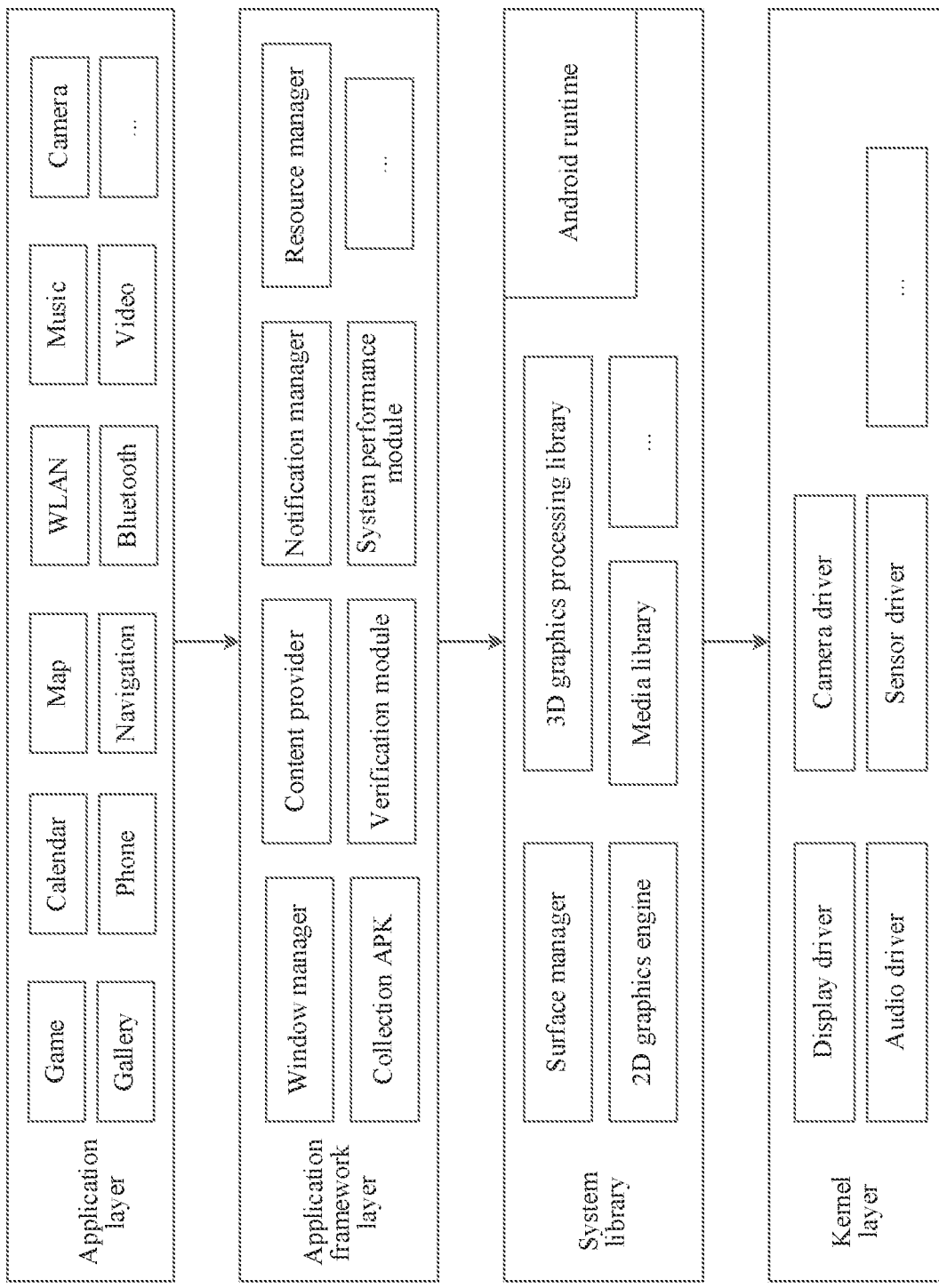
FIG. 2C is a schematic diagram of a structure of another terminal according to an embodiment of this application.

FIG. 2C is a block diagram of the software structure of the terminal according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2C, the application package may include applications such as Game, Camera, Gallery, Calendar, Phone, Map, Navigation, WLAN, Bluetooth, Music, Video, and the like.

The application framework layer provides an application programming interface (application programming interface, API) and a programming framework for an application at the application layer. The application framework layer includes some predefined functions.

As shown in FIG. 2C, the application framework layer may include a collection Android application package (Android application package, APK), a verification module, a system performance module, a window manager, a content provider, a view system, a resource manager, a notification manager, and the like.

The collection APK is configured to collect game running data during running of a game, report the collected game running data to a cloud server, and download a configuration parameter corresponding to the game from the cloud server. As a function implementation, the collection APK may be located at the application framework layer, or may be integrated into a game application. This is not limited in embodiments of this application.

The verification module is configured to perform, during running of the game, verification on the configuration parameter obtained from the cloud. As a function implementation, the verification module may be located at the application framework layer, or may be integrated into the game application or another application. This is not limited in embodiments of this application.

The system performance module is configured to collect performance parameters during running of the game.

The window manager is configured to manage a window program. The window manager may obtain a size of the display, determine whether there is a status bar, perform screen locking, take a screenshot, and the like.

The content provider is configured to, store and obtain data, and enable the data to be accessed by an application. The data may include a video, an image, audio, calls that are made and answered, a browsing history and a bookmark, an address book, and the like.

The resource manager provides various resources for an application, such as a localized character string, an icon, an image, a layout file, a video file, and the like.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, an alert sound is played, the terminal vibrates, and the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a 3D graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, PNG, and the like.

The 3D graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Embodiments of this application provide a performance optimization method for a terminal. In the method, a server receives first running data from a plurality of terminals, where the first running data includes running data generated when the plurality of terminals run a first scene of a first application, and models of the plurality of terminals are a first model. The server determines a first configuration parameter based on the first model, identification information of the first application, and the first running data, where the first configuration parameter is used by a terminal of the first model to perform parameter configuration on the terminal when the terminal runs the first scene of the first application. The server sends the first configuration parameter to a first terminal, and correspondingly, the first terminal receives the first configuration parameter from the server, where a model of the first terminal is the first model, and the first configuration parameter includes a configuration parameter corresponding to the first scene of the first application. The first terminal determines a first scene during running of the first application, and runs the first scene of the first application based on the first configuration parameter. According to embodiments of this application, the server may recommend, for a same model, a same application, and a same scene, a configuration parameter used for performance optimization, and the terminal may perform performance optimization on the first scene of the first application based on the configuration parameter recommended by the server, to improve user experience.

The following first describes a process in which the server determines the first configuration parameter.

Figure 3:
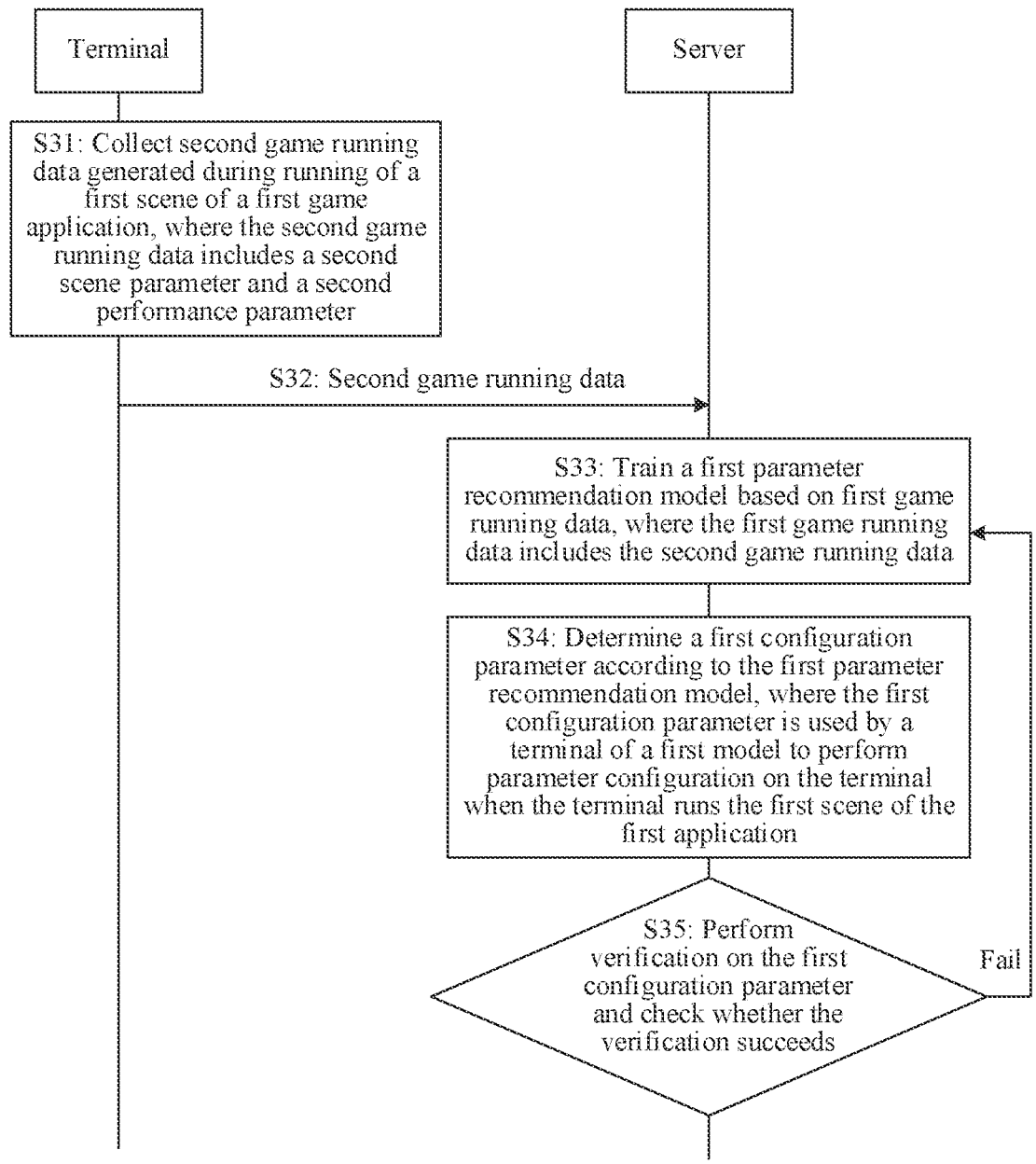
FIG. 3 is a schematic flowchart of a configuration parameter determining method according to an embodiment of this application.

FIG. 3 is a schematic flowchart of a configuration parameter determining method according to an embodiment of this application. As shown in FIG. 3, a procedure of the method is as follows:

S31: A terminal collects second game running data generated during running of a first scene of a first game application.

The first scene is a high-load scene. The first scene in this embodiment of this application may be one or more scenes. That is, the first scene may be a high-load scene in a running process of the first game application, or may be a plurality of high-load scenes in the running process of the first game application. For ease of understanding, unless otherwise specified, the following uses an example in which the first scene is one scene for description.

The high-load scene may also be referred to as a high-performance scene, a high-load scene, or the like. A name of the high-load scene is not limited in this application. The high-load scene may be a scene in which a requirement for a software resource or a hardware resource exceeds a specified threshold in the running process of the first game application. For example, a high-load scene in the running process of the first game application is marked by using a game service software development package (software development kit, SDK) of the game application. In the high-load scene, a game interface is prone to have frame freezing, unclear image quality, a temperature rise of a device housing, and the like, which affect user game experience. For ease of understanding. Table 3 shows an example of a high-load scene in a running process of a game application. Table 3 shows an example of the Knives Out. When two or more users fight on a game interface, the scene is a high-load scene 1. When four users move quickly by vehicle on a game interface, the scene is a high-load scene 2. When a plurality of users and more than 20 materials appear on a game interface, the scene is a high-load scene 3. A normal scene is a scene other than the high-load scene in a running process of the first game application, that is, a scene in which a requirement for a software resource and a hardware resource in a running process of the first game application does not exceed the specified threshold.

TABLE 3

| Game name | High-load scene | Game interface |
| --- | --- | --- |
| Knives Out | High-load scene 1 | Two or more users fight |
| | High-load scene 2 | Four users move quickly by vehicle |
| | High-load scene 3 | A plurality of users and more than 20 materials appear |

The second game running data may be running data generated when the terminal runs the first scene of the first game application based on a second configuration parameter. Correspondingly, the first scene is one or more high-load scenes in a process in which the terminal runs the first game application based on the second configuration parameter. For example, the first game application is installed on the terminal, and the terminal runs the first game application based on the second configuration parameter in response to a start operation of a user. In the running process of the first game application, one or more high-load scenes (that is, the first scene) occur, and game running data in the one or more high-load scenes is collected.

The second configuration parameter may be a configuration parameter currently locally stored in the terminal. For example, the second configuration parameter may be a default configuration parameter of the terminal before delivery, or a configuration parameter recommended by the server last time, or a configuration parameter obtained after a system version of the terminal is updated, or a configuration parameter obtained after a version of the first game application is updated, or the like. This is not limited in this embodiment of this application.

The second game running data may include a second scene parameter and a second performance parameter. For example, the terminal may collect a scene parameter and a performance parameter in one or more high-load scenes. For example, the terminal may collect the scene parameter in the high-load scene by using a game service SDK integrated into the first game application. For example, the terminal may collect the performance parameter in the high-load scene by using hardware-related control software.

The scene parameter may be game data related to a current high-load scene in the running process of the first game application. The scene parameter may include but is not limited to one or more of the following parameters, a high-load scene entry/exit identifier, a scene type, instance data, and the like.

The high-load scene entry/exit identifier is an identifier for entering and exiting a high-load scene. For example, if a current scene is switched from a normal scene to a high-load scene, the terminal may determine that current time is entry time of the high-load scene, and mark the entry time (for example, add a timestamp). If a current scene is switched from a high-load scene to a normal scene, the terminal may determine that current time is exit time of the high-load scene, and mark the exit time.

The scene type indicates a scene type corresponding to a current high-load scene. The Knives Out is used as an example. The scene type may include a battle scene, a parachuting scene, a car racing scene, a scene of running to a safe circle, and the like. The scene identification information identifies each scene in the running process of the first game application. It may be understood that scene types of different game applications may be the same or may be different. For a game application, a scene type may be predefined, or preset by a game application provider. This is not limited in this embodiment of this application. Alternatively, the high-load scene may be predefined, or preset by the game application provider. This is not limited in this embodiment of this application.

The instance data is a quantity of users on a same screen a quantity of objects, and building size in a current high-load scene.

The Knives Out is used as an example. The Knives Out is run on the terminal. A game interface is switched from a parachuting scene to a multi-player battle scene. The terminal determines that the game enters a high-load scene, marks entry time and exit time of the high-load scene, and determines that the high-load scene is the scene type 1. Further, the terminal collects statistics on data such as a maximum (or an average) quantity of users, a maximum (or an average) quantity of objects, an object size, and the like on a same screen in a time period corresponding to the high-load scene.

The performance parameter may be system data related to a current high-load scene in the running process of the first game application. The performance parameter may include, but is not limited to, one or more of the following parameters: rendering duration of the first frame, an average frame rate, a jitter rate, a low frame rate ratio, power consumption, a device housing temperature, a quantity of lost frames, or the like.

The rendering duration of the first frame is rendering duration of the first frame when the first game application is started. For example, the rendering duration of the first frame may be understood as duration elapsed since the terminal receives a start operation on the first game application until the terminal displays a login interface of the first game application.

The average frame rate is an average frame rate in a time period corresponding to the high-load scene. A frame rate is to a frequency (or a rate) at which bitmap images in units of frames continuously appear on a display interface.

The jitter rate is used to measure stability of a game image in a time period corresponding to the high-load scene.

The frame freezing count is a frame freezing count of the first game application in the time period corresponding to the high-load scene.

The low frame rate ratio is a ratio of a quantity of low frame rates to a total quantity of frame rates in the time period corresponding to the high-load scene. The low frame rate is a frame rate lower than a specified threshold.

The power consumption is power consumption of the terminal running the first game application in the time period corresponding to the high-load scene.

The device housing temperature is a highest housing temperature of the terminal in the time period corresponding to the high-load scene.

The quantity of lost frames is a quantity of lost frames in a running process of the first game application in the time period corresponding to the high-load scene.

The Knives Out is used as an example. The Knives Out is run on the terminal. A game interface is switched from the parachuting scene to the battle scene, and the terminal determines that the game enters the high-load scene. When the game interface is switched from the battle scene to the normal scene, the terminal determines that the game exits the high-load scene, and collects statistics on an average frame rate, a jitter rate, a frame freezing count, a low frame rate ratio, power consumption, a device housing temperature, and a quantity of lost frames in a time period corresponding to the high-load scene. Further, the terminal may further collect rendering duration of the first frame when the Knives Out is started.

Table 4 shows an example of scene parameters and performance parameters by using the Knives Out as an example. As shown in Table 4, a scene parameter corresponding to a scene 1 is that a quantity of objects on a same screen of a game interface is greater than 50 and less than 100, and a performance parameter is that power consumption is less than 1500 mA. A performance parameter corresponding to a scene 2 is that a plurality of applications are run simultaneously. A performance parameter corresponding to a scene 3 is that a highest temperature of a device is 48° C. A performance parameter corresponding to a scene 4 is that an average frame rate is 4 fs and is lower than an average frame rate (60 fps) recommended by the first game application, and a low frame rate ratio is greater than 5%.

TABLE 4

| Game name | Scene parameter | Performance parameter | Scene identification information |
|---|---|---|---|
| Knives Out | A quantity of objects on a same screen of a game interface is greater than 50 and less than 100 | Power consumption is less than 1500 mA | Scene 1 |
| | | A plurality of applications are run simultaneously | Scene 2 |
| | | A highest housing temperature of a device is 48° C. | Scene 3 |
| | | The average frame rate is 40 fps and is lower than the recommended average frame rate (60 fps) of the first game application, and the low frame rate ratio is greater than 5% | Scene 4 |

S32: The terminal sends the second game running data to the server. Correspondingly, the server receives the second game running data.

The second game running data includes the second scene parameter and the second performance parameter. It may be understood that because one or more high-load scenes may occur in the running process of the first game application, the second game running data may include one group of scene parameter and performance parameter, or may include a plurality of groups of scene parameters and performance parameters. For example, the terminal may report the scene parameter and the performance parameter in the high-load scene to the server in real time. That is, the terminal reports the scene parameter and the performance parameter to the server each time the terminal collects the scene parameter and the performance parameter. The second game running data includes one group of scene parameter and performance parameter. Alternatively, the terminal may report the scene parameter and the performance parameter in the high-load scene to the server after the running of the first game application ends. That is, the terminal reports scene parameters and performance parameters in all high-load scenes in a running period of the first game application to the server. In this case, the second game running data includes one or more groups of scene parameters and performance parameters.

In a possible implementation, the second game running data may further include model information of the terminal. Terminals of different models (for example, terminals of different models of a same brand or terminals of different models of different brands) have different hardware resources before delivery. Therefore, when a same game application is run on terminals of different models, performance of the game application is different. For example, a same game application is displayed as a high-load scene on a low-configuration terminal, and is displayed as a normal scene on a high-configuration terminal.

In another possible implementation, the second game running data may further include identification information of the first game application, to distinguish the first game application from another game application. For example, the server may maintain game running data of a plurality of game applications on the terminal, and the identification information of the first game application may be used to distinguish the first game application from another game application in the plurality of game applications.

In another possible implementation, the second game running data may further include identification information of the terminal. In this embodiment of this application, the server may receive second game running data from a plurality of terminals of the first model in the open beta test phase. The second game running data may include game running data, model information of the terminals, the identification information of the first game application, and identification information of the terminals. That is, the server collects game running data of the first game application on the plurality of terminals of the same model in the open beta test phase. The identification information of the terminals may be used by the server to identify the plurality of terminals of the same model, so as to obtain a more accurate configuration parameter for each terminal. For example, the identification information of the terminal may be an internet protocol (internet protocol, IP) address, a media access control (media access control, MAC) address, or other identification information that is distinguished from that of another terminal.

Through step S31 and step S32, the server may collect the second game running data generated when the plurality of terminals run the first scene of the first game application. Models of the plurality of terminals are the same, and are all the first model. For ease of understanding of this embodiment of this application, the second game running data collected by the server from the plurality of terminals is referred to as first game running data in the following. In other words, the first game running data may be understood as a plurality of pieces of second game running data.

For example, the server may alternatively receive game running data of the first game application in terminals of different models. For example, the server may maintain the game running data, for example, store the game running data of the first game application in the plurality of terminals by using the model information of the terminal as an index. For ease of understanding, Table 5 shows an example of game running data maintained by the server. Table 5 shows game running data of a same game application in the plurality of terminals of different models by using the Knives Out as an example.

TABLE 5

| Game name | Game phase | Second game running data | | |
|---|---|---|---|---|
| | | Model information of a terminal | Identification information of a terminal | Game running data |
| Knives Out | Open beta test phase Official release phase | Model 1 Model 2 Model 1 Model 2 Model 3 | Terminal 1 Terminal 2 | Game running data 1 Game running data 2 Game running data 3 Game running data 4 Game running data 5 |

S33: The server trains a first parameter recommendation model based on the first game running data.

The first game running data includes the second game running data in step S32. The first game running data may be game running data obtained in the open beta test phase, or may be game running data obtained in the official release phase, or may be game running data obtained in the open beta test phase and the official release phase. This is not limited in this embodiment of this application.

The server may tram the first parameter recommendation model based on the first game running data. For example, the server may construct a training sample based on the first game running data, train the first parameter recommendation model based on the training sample until the model meets an expectation, and store the first parameter recommendation model, as shown in Table 2. Training sample data may include the model information of the terminal, the identification information of the first game application, identification information of the first scene, and the first game running data (a scene parameter and a performance parameter).

After the training is completed, the first parameter recommendation model may be used to recommend a configuration parameter for the terminal of the first model in the first scene of the first game application. An input of the first parameter recommendation model may be the model information of the terminal and identification information of a game application, and an output may include but is not limited to one or more of the following parameters: the identification information of the first scene, a running frequency, a temperature, a memory size, a network speed of a chip (for example, a CPU and/or a GPU) corresponding to the identification information of the first scene, data information (such as a quantity, a network speed, and the like) of another application that is running simultaneously, or the like.

For example, the server may periodically (for example, weekly, monthly, or the like) update the first parameter recommendation model based on obtained game running data, or may aperiodically update the first parameter recommendation model based on obtained game running data. For example, when a size of the obtained game running data reaches a specified threshold (for example, 1000 pieces of second game running data), the server may update the first parameter recommendation model based on the obtained game running data. For another example, when a ratio of a quantity of terminals that send the second game running data to a quantity of terminals of the first model on which the first game application is currently installed reaches a specified ratio (for example, 10%, 15%, or the like), the server may update the first parameter recommendation model based on the obtained game running data.

S34: The server obtains a first configuration parameter based on the first parameter model.

After the training of the first parameter recommendation model is completed, the server may input the model information of the terminal and the identification information of the first game application into the first parameter recommendation model, to obtain the first configuration parameter. The first configuration parameter may be used to configure, for the first scene of the first game application running on the terminal of the first model, a hardware resource that can be used by the first game application, a software resource that can be used by the first game application, or a hardware resource and a software resource that can be used by the first game application.

The first configuration parameter may include the identification information of the first scene and one or more of the following parameters corresponding to the identification information of the first scene: a running frequency of CPU, a running frequency of a GPU, quantities of big cores and small cores of the CPU, a GPU size, a highest temperature for triggering a temperature control policy, a network speed priority, or the like.

It should be noted that the first scene in this embodiment of this application may be one or more scenes. Correspondingly, when the first scene is one scene, the first configuration parameter may be used to configure a hardware resource and/or a software resource that can be used by the first game application in the scene. When the first scene is a plurality of scenes, the first configuration parameter may be used to configure hardware resources and/or software resources that can be used by the first game application in the plurality of scenes.

In step S34, the server may obtain the first configuration parameter according to the first parameter recommendation model after training of the first parameter recommendation model is completed. In another possible implementation, the server may store the trained first parameter recommendation model locally, and receive a first request message from the terminal. The first request message includes the model information of the terminal and the identification information of the first game application. For example, the terminal may periodically (for example, weekly) send the first request message to the server, or may aperiodically send the first request message to the server, for example, send the first request message after a version of the first game application is updated. Further, in response to the first request message, the server may obtain the first configuration parameter according to the first parameter recommendation model, and send a first response message to the terminal device. The first response message includes the first configuration parameter.

After determining the first configuration parameter, the server may update the first configuration parameter to a recommended configuration parameter of the first game application on the terminal of the first model, or may perform verification on the first configuration parameter, that is, perform content of step S35. In this way, it can be determined whether the first configuration parameter can optimize running performance of the first game application on the terminal of the first model, to improve reliability.

S35: The server performs verification on the first configuration parameter. If the verification on the first configuration parameter succeeds, the procedure ends; or if the verification on the first configuration parameter fails, the server performs the content of step S33.

After determining the first configuration parameter, the server may perform verification on the first configuration parameter, to determine whether the first configuration parameter effectively optimizes the first scene of the first game application running on the terminal of the first model. For example, the server may perform verification on the first configuration parameter once or more times by using a cloud device. Specifically, the cloud device may simulate a terminal of the first model, run the first scene of the first game application based on the first configuration parameter, collect a third performance parameter generated when the cloud device runs the first scene of the first game application based on the first configuration parameter, and then perform verification on the first configuration parameter based on the third performance parameter and a fourth performance parameter. For example, the server may determine, by comparing the third performance parameter with the fourth performance parameter, whether the first configuration parameter can effectively optimize the first scene of the first game application running on the terminal of the first model.

The fourth performance parameter is stored on the server. For example, the fourth performance parameter is a predefined performance parameter or a performance parameter corresponding to a third configuration parameter. For example, the cloud device simulates a terminal of the first model, runs the first scene of the first game application based on the third configuration parameter, obtains a performance parameter (that is, the third performance parameter) generated when the cloud device runs the first scene of the first game application based on the third configuration parameter, and stores the performance parameter. The third configuration parameter may be a default configuration parameter of the terminal of the first model before delivery, or a configuration parameter updated by the server last time, or a configuration parameter obtained after a system version of the terminal of the first model is updated, or a configuration parameter obtained after a version of the first game application is updated, or the like. This is not limited in this embodiment of this application.

It may be understood that the third configuration parameter may be the same as the second configuration parameter in step S31 (for example, both are default configuration parameters of the terminal of the first model before delivery), or may be different (for example, the second configuration parameter is a default configuration parameter, and the third configuration parameter is a configuration parameter updated by the server).

The server may perform verification on the first configuration parameter with reference to a verification indicator based on the third performance parameter and the fourth performance parameter. The verification indicator may be predefined, may be provided by an agent of the first game application, may be provided by a terminal supplier, or the like. This is not limited in this application. For example, the server may determine, based on the verification indicator, one or more parameters that are in the third performance parameter and that are better than that in the fourth performance parameter, and then determine, based on the one or more parameters, whether the verification succeeds. For example, the server may score each parameter in the third performance parameter based on the fourth performance parameter by using a scoring system, to obtain a score of the third performance parameter, and then determine, based on whether a ratio of the score of the third performance parameter to a total score reaches a specified threshold, whether the verification succeeds.

For ease of understanding, Table 6 shows an example of the verification indicator. The total score 100 of the verification indicator is used as an example, and Table 6 shows: When rendering duration of the first frame in the third performance parameter is shorter than or equal to that in the fourth performance parameter, the third performance parameter is scored 15; or otherwise, the third performance parameter is scored 0. When an average frame rate in the third performance parameter is increased by 10% or more than 10% compared with that in the fourth performance parameter, the third performance parameter is scored 10; if the average frame rate in the third performance parameter is increased by more than 0 but less than 10% compared with that in the fourth performance parameter, the third performance parameter is scored 7; or if the average frame rate in the third performance parameter is not increased compared with that in the fourth performance parameter, the third performance parameter is scored 0. When a jitter rate in the third performance parameter is decreased by 10% or more than 10% compared with that in the fourth performance parameter, the third performance parameter is scored 10; if the jitter rate in the third performance parameter is decreased by more than 0 but less than 10% compared with that in the fourth performance parameter, the third performance parameter is scored 7; or if the jitter rate in the third performance parameter is not decreased compared with that in the fourth performance parameter, the third performance parameter is scored 0. When a frame freezing count in the third performance parameter is decreased by 10% or more than 10% compared with that in the fourth performance parameter, the third performance parameter is scored 15; if the frame freezing count in the third performance parameter is decreased by more than 0 but less than 10% compared with that in the fourth performance parameter, the third performance parameter is scored 12; or if the frame freezing count in the third performance parameter is not decreased compared with that in the fourth performance parameter, the third performance parameter is scored 0. When a low frame rate ratio in the third performance parameter is decreased by 10% or more than 10% compared with that in the fourth performance parameter, the third performance parameter is scored 10; if the low frame rate ratio in the third performance parameter is decreased by more than 0 but less than 10% compared with that in the fourth performance parameter, the third performance parameter is scored 7; or if the low frame rate ratio in the third performance parameter is not decreased compared with that in the fourth performance parameter, the third performance parameter is scored 0. When power consumption in the third performance parameter is decreased by 5% or more than 5% compared with that in the fourth performance parameter, the third performance parameter is scored 15; if the power consumption in the third performance parameter is decreased by more than 0 but less than 5% compared with that in the fourth performance parameter, the third performance parameter is scored 12; or if the power consumption in the third performance parameter is not decreased compared with that in the fourth performance parameter, the third performance parameter is scored 0. When a device housing temperature in the third performance parameter is decreased or equal to that in the fourth performance parameter, the third performance parameter is scored 15: or otherwise, the third performance parameter is scored 0. When a frame loss rate in the third performance parameter is decreased by 10% or more than 10% compared with that in the fourth performance parameter, the third performance parameter is scored 10; if the frame loss rate in the third performance parameter is decreased by more than 0 but less than 10% compared with that in the fourth performance parameter, the third performance parameter is scored 7; or if the frame loss rate in the third performance parameter is not decreased compared with that in the fourth performance parameter, the third performance parameter is scored 0. According to Table 6, the server may obtain a score of the third performance parameter. When the score of the third performance parameter is greater than or equal to a specified threshold (for example, 90, 80, or the like), the server may determine that verification on the third performance parameter succeeds; or otherwise, the server determines that verification of the third performance parameter fails. It may be understood that the data in Table 6 is used as an example to facilitate understanding of this embodiment of this application. However, this embodiment of this application is not limited thereto.

TABLE 6

| Verification indicator (100 points) | Compare the third performance parameter with the fourth performance parameter | Score |
| --- | --- | --- |
| Rendering duration of the first frame (15 points) | Shortened or equal | 15 |
| | Not shortened | 0 |
| Average frame rate (10 points) | Increased by 10% or more than 10% | 10 |
| | Increased by more than 0 and less than 10% | 7 |
| | Not Increased | 0 |
| Jitter rate (10 points) | Decreased by 10% or more than 10% | 10 |
| | Decreased by more than 0 and less than 10% | 7 |
| | Not decreased | 0 |
| Frame freezing count (15 points) | Decreased by 10% or more than 10% | 15 |
| | Decreased by more than 0 and less than 10% | 12 |
| | Not decreased | 0 |
| Low frame rate ratio (10 points) | Decreased by 10% or more than 10% | 10 |
| | Decreased by more than 0 and less than 10% | 7 |
| | Not decreased | 0 |
| Power consumption (15 points) | Decreased by 5% or more than 5% | 15 |
| | Decreased by more than 0 and less than 5% | 12 |
| | Not decreased | 0 |
| Device housing temperature (15 points) | Decrease or unchanged | 15 |
| | Increased | 0 |
| Frame loss rate (10 points) | Decreased by 10% or more than 10% | 10 |
| | Decreased by more than 0 and less than 10% | 7 |
| | Not decreased | 0 |

In step S35, the server may perform verification on the first configuration parameter for one or more times. This is not limited in this embodiment of this application. For example, when the server performs verification once, if the verification fails, the server determines that the verification on the first configuration parameter fails, and retrains the first parameter recommendation model, that is, performs content of step S33; otherwise, the server determines that the verification on the first configuration parameter succeeds, and the procedure ends. For another example, when the server performs verification for a plurality of times, if a specified quantity of times of verification (for example, 10% of a total quantity of times of verification) in the plurality of times of verification fails, the server determines that the verification on the first configuration parameter fails, and performs the content of step S33; otherwise, the server determines that the verification on the first configuration parameter succeeds, and the procedure ends.

If the verification on the first configuration parameter fails, the server may retrain the first parameter configuration model. For example, the server adjusts a parameter in the model and retrains the model based on the first game running data, that is, performs step S33 and step S34 until the verification succeeds or the server sends a verification failure message to the management personnel for manual positioning.

If the verification on the first configuration parameter succeeds, the server may update the first configuration parameter to the recommended parameter of the first scene of the first game application on the terminal of the first model. According to the procedure shown in FIG. 3, the server may obtain and maintain recommended parameters of different game applications, different terminals, and different scenes. For ease of understanding, Table 7 shows an example of configuration parameters maintained by the server. Table 7 shows configuration parameters corresponding to different game applications, different models, and different scenes by using the Knives Out and the Arena of Valor as an example.

TABLE 7

| Game name | Model information of a terminal | Scene identification information | Configuration parameter |
| --- | --- | --- | --- |
| Knives Out | Model 1 | Scene 1 | Configuration parameter 1 |
| | | Scene 2 | Configuration parameter 2 |
| | | Scene 3 | Configuration parameter 3 |
| | Model 2 | Scene 1 | Configuration parameter 4 |
| Arena of Valor | Model 2 | Scene 4 | Configuration parameter 5 |
| | | Scene 5 | Configuration parameter 6 |
| | Model 3 | Scene 6 | Configuration parameter 7 |

In the procedure shown in FIG. 3, the first configuration parameter is an optimization policy obtained by the server based on a large amount of game running data generated when the first game application is run on a plurality of terminals of the first model. Hardware resources of terminals of different models are different. The server simulates a terminal of the first model by using a cloud device, so that a running environment of the first game application in the terminal of the first model can be simulated. When the first game application is run on the cloud device based on the first configuration parameter, a performance parameter of the first scene when the first game application is run on the terminal of the first model may be collected, and verification is performed on the first configuration parameter based on the performance parameter. After the verification succeeds, the first configuration parameter is sent to the terminal of the first model. In this way, it can be ensured that the first configuration parameter can improve performance when the first scene of the first game application is run on the terminal of the first model, user experience can be improved, and reliability of the first configuration parameter can be improved.

In this case, a process in which the server determines the first configuration parameter ends.

The foregoing describes the process in which the server determines the first configuration parameter, and the following describes a process in which the terminal performs performance optimization based on the first configuration parameter.

Figure 4:
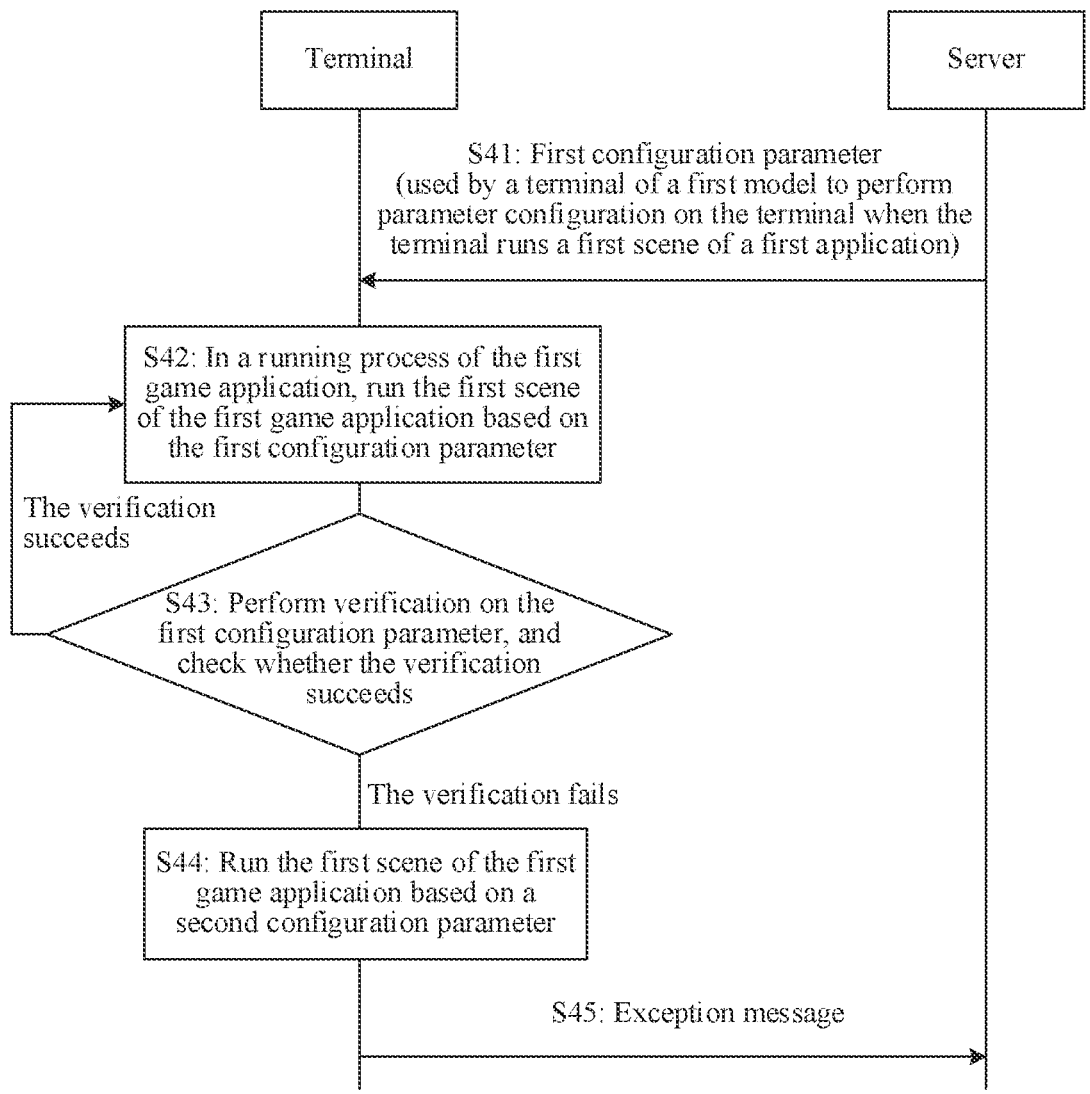
FIG. 4 is a schematic flowchart of a performance optimization method according to an embodiment of this application.

FIG. 4 is a schematic flowchart of a performance optimization method according to an embodiment of this application. As shown in FIG. 4, a procedure of the method is as follows:

S41: A server sends a first configuration parameter to a terminal. Correspondingly, the terminal receives the first configuration parameter from the server.

The first configuration parameter is recommended by the server and is used to optimize performance of a first game application in a running process on the terminal. Specifically, the first configuration parameter may be a parameter that is determined by the server based on game running data that is generated when a plurality of terminals run a first scene of the first game application and that is verified. The first configuration parameter may be used to configure, for the first scene of the first game application running on the terminal of the first model, a hardware resource that can be used by the first game application, a software resource that can be used by the first game application, or a hardware resource and a software resource that can be used by the first game application. Models of the plurality of terminals are the same, and are all the first model. For specific description of the first configuration parameter, refer to the description related to the first configuration parameter in step S34. Details are not described herein again.

In step S41, the server may actively push an updated configuration parameter, that is, the first configuration parameter, to the terminal. For example, after the new configuration parameter is verified, the server may update a locally stored configuration parameter, and push the updated configuration parameter to the terminal. For example, in the open beta test phase, the server may actively push an updated configuration parameter to the terminal based on identification information of the terminal.

Alternatively, the terminal may send a first request message to the server. Correspondingly, after receiving the first request message, the server may send a first response message to the terminal. The first request message may include model information of the terminal, identification information of the first game application, and the like. The first response message includes the first configuration parameter. For example, the terminal may send the first request message to the server when the first game application is started. For example, a user taps an icon of the first game application in a display interface of the terminal, and the terminal starts the first game application and sends the first request message to the server as a response. After receiving the first request message, the server may send the first response message to the terminal, or determine the first configuration parameter based on a first parameter recommendation model, and send the first response message to the terminal. For another example, the terminal may periodically (for example, every early morning or every Sunday) send the first request message to the server. Correspondingly, after receiving the first request message, the server may send the first response message to the terminal, or determine the first configuration parameter according to the first parameter recommendation model, and send the first response message to the terminal.

The first request message may be used to request an updated configuration parameter, or may be used to request a configuration parameter.

For example, when the first request message is used to request an updated configuration parameter, after receiving the first request message, the server may determine, based on the model information of the terminal and the identification information of the first game application, whether the configuration parameter of the first game application is updated. When the configuration parameter of the first game application is updated, the first response message sent by the server to the terminal includes the updated configuration parameter. When the configuration parameter of the first game application is not updated (for example, the updated configuration parameter has been sent to the terminal), the first response message sent by the server to the terminal may be a negative acknowledgment (negative acknowledgment, NACK) message. Further, the terminal may run the first game application based on a second configuration parameter.

For another example, when the first request message is used to request a configuration parameter, after receiving the first request message, the server may determine, based on the model information of the terminal and the identification information of the first game application, that the configuration parameter of the first game application is the first configuration parameter; or input the model information of the terminal and the identification information of the first game application into the first parameter recommendation model to obtain the first configuration parameter. The server sends the first response message to the terminal, and the first response message includes the first configuration parameter. In this case, the first configuration parameter and the second configuration parameter may be the same or may be different.

S42: In a running process of the first game application, the terminal runs the first scene of the first game application based on the first configuration parameter.

After the terminal receives the first configuration parameter from the server, in the running process of the first game application, the terminal may run the first scene of the first game application based on the first configuration parameter. For example, the terminal may store the first configuration parameter in a system directory in an XML format, and when the first game application is run, the first configuration parameter may be invoked. The first configuration parameter includes scene identification information and the like. The first configuration parameter is obtained for the first scene. The first scene may be one or more scenes. Correspondingly, the first configuration parameter may include a configuration parameter corresponding to one scene, or may include configuration parameters corresponding to a plurality of scenes. The scene identification information may be used to distinguish a scene to which a configuration parameter is applied. Specifically, the terminal may determine the first scene in the running process of the first game application, and run the first scene based on the first configuration parameter. For example, the terminal may invoke, in the running process of the first game application, a game service SDK integrated into the first game application. The game service SDK determines whether a current scene is the first scene. If it is determined that the current scene is the first scene, the terminal obtains a configuration parameter corresponding to the first scene from the system directory based on identification information of the first scene, and runs the first scene based on the configuration parameter corresponding to the first scene.

In the running process of the first game application, the terminal performs parameter configuration based on the first configuration parameter. For ease of understanding, Table 8 shows corresponding configuration parameters in different scenes. As shown in Table 8, if the current scene is a scene 1, the terminal may limit a frequency of a GPU according to a temperature control policy, but does not limit a frequency of a CPU, and preferentially configures CPU big core and small core resources for the first game application. If the current scene is a scene 2, the terminal may set a highest network speed priority for the first game application. If the current scene is a scene 3, the terminal may increase a highest temperature of the temperature control policy by 2° C., that is, increased to 50° C. If the current scene is a scene 4, the terminal may add 4 M GPU cache resources, four CPU big cores, and four CPU small cores for the first game application.

TABLE 8

| Scene identification information | First configuration parameter |
|---|---|
| Scene 1 | The frequency of the GPU is limited according to the temperature control policy, but the frequency of the CPU is not limited, and CPU big core and small core resources are preferentially configured for the first game application |

TABLE 8-continued

| Scene identification information | First configuration parameter |
|---|---|
| Scene 2 | Set the highest network speed priority when the first game application is running |
| Scene 3 | The highest temperature of the temperature control policy is increased by 2° C., that is, increased to 50° C. |
| Scene 4 | 4 MB GPU cache resources are added, and four CPU big cores and four CPU small cores are allocated to the first game application |

For example, the first configuration parameter is used to configure two scenes. In the first scene, configuration parameters recommended by the server are: An average frame rate is 60 fps, a device housing temperature is higher than 50° C., a frequency limiting policy is triggered, a running frequency of a GPU is limited according to the temperature control policy, a running frequency of a CPU is not limited, a network speed priority is the highest, there are four CPU big cores and four CPU small cores, and a GPU cache is four megabytes (mbyte, M). In the second scene, configuration parameters recommended by the server are as follows: An average frame rate is 50 fps, when a device housing temperature is higher than 45° C. a frequency limiting policy is triggered, a running frequency of a GPU is not limited, a running frequency of a CPU is limited according to the temperature control policy. In this case, a format of the first configuration parameter recommended by the server to the terminal may be as follows:

<scene id="0">//first scene
  <fps_recommend>60</fps_recommend>//recommended frame rate in this scene
    <temp_limit>50</temp_limit>//another frequency limiting policy is triggered when the temperature is 50° C.
  <gpu_limit>1</gpu_limit>//GPU running frequency is limited based on temperature control
  <cpu_limit>0</cpu_limit>//CPU running frequency does not need to be limited
  <net_limit_type>0</net_limit_type>//a highest network speed priority is configured for an application
  <cpu_big_num>4</cpu_big_num>//quantity of CPU big cores that are preferentially allocated
  <cpu_small_num>4</cpu_small_num>//quantity of CPU small cores that are preferentially allocated
  <gpu_cache>4</gpu_cache>//GPU cache specified as 4 M
<scene id="1">//second scene
  <fps_recommend>50</fps_recommend>/% recommended frame rate in this scene
    <temp_limit>45</temp_limit>//another frequency limiting policy is triggered when the temperature is 45° C.
  <gpu_limit>0</gpu_limit>//running frequency of a GPU does not need to be limited
  <cpu_limit>1</cpu_limit>//running frequency of a CPU is limited based on temperature control S43: When running the first scene of the first game application based on the first configuration parameter, the terminal performs verification on the first configuration parameter. If the verification on the first configuration parameter succeeds, the terminal continues running the first scene of the first game application based on the first configuration parameter, and the procedure ends. If the verification on the first configuration parameter fails, the terminal performs content of S44.

In a process of running the first scene of the first game application based on the first configuration parameter, the terminal may perform verification on the first configuration parameter, to determine whether the first configuration parameter effectively optimizes running of the first scene of the first game application by the terminal. For example, the terminal may collect a first performance parameter when the first scene of the first game application is run based on the first configuration parameter, and then perform verification on the first configuration parameter based on the first performance parameter and a second performance parameter. For example, the terminal may determine, by comparing the second performance parameter with the first performance parameter, whether the first configuration parameter can perform performance optimization on the first scene of the first game application running on the terminal. The second performance parameter may be locally stored in the terminal. For example, the second performance parameter is a predefined performance parameter or a performance parameter corresponding to a second configuration parameter. For example, the terminal runs the first game application based on the second configuration parameter, obtains a performance parameter (that is, the second performance parameter) in the first scene in a running process, and stores the performance parameter.

The terminal may perform verification on the first configuration parameter with reference to a verification indicator based on the first performance parameter and the second performance parameter. The verification indicator may be predefined, may be provided by an agent of the first game application, may be provided by a terminal supplier, or the like. This is not limited in this application. For a specific implementation process, refer to content of step S35. Details are not described herein again.

Optionally, after the verification on the first configuration parameter succeeds, the terminal may delete the local second configuration parameter, to improve storage resource utilization.

S44: The terminal runs the first scene of the first game application based on the second configuration parameter.

When the verification on the first configuration parameter fails, the terminal runs the first scene of the first game application based on the second configuration parameter. The second configuration parameter is locally stored in the terminal. The second configuration parameter may be a configuration parameter currently locally stored in the terminal. For example, the second configuration parameter may be a default configuration parameter of the terminal before delivery, or a configuration parameter recommended by the server last time, or a configuration parameter obtained after a system version of the terminal is updated, or a configuration parameter obtained after a version of the first game application is updated, or the like. This is not limited in this embodiment of this application.

As an electronic device, performance of the terminal is affected by use frequency, use duration, system version update, or the like. A mobile phone is used as an example, performance of a same mobile phone is optimal when the mobile phone is just released. With an increase of use duration of a user or one or more updates of a system version, performance of the mobile phone gradually decreases, for example, available memory resources are increasingly fewer or the like. According to step S43 and step S44, in a process in which the terminal runs the first scene of the first game application based on the first configuration parameter, the terminal performs verification again on the first configuration parameter that is verified by the server. In this way, negative optimization and the like caused by an individual difference between terminals of a same model can be avoided. Further, when negative optimization occurs, the terminal may restore the original second configuration parameter, and run the first scene of the first game application based on the second configuration parameter. In this way, it can be ensured that the first game application is effectively optimized, and user experience is improved.

S45: The terminal sends an exception message to the server. Correspondingly, the server receives the exception message.

When the verification on the first configuration parameter fails, the terminal may further send an exception message to the server. Correspondingly, the server receives the exception message from the terminal. The exception message may include the model information of the terminal, the identification information of the first application, and game running data generated when the terminal runs the first game application in the first scene based on the first configuration parameter. Further, when a ratio of a quantity of terminals that report the exception message to a quantity of terminals of the first model on which the first game application is currently installed (for example, the server may obtain, by collecting statistics on downloading of compressed packages of the first game application, the quantity of terminals of the first model on which the first game application is currently installed) reaches a specified ratio (for example, 10%), the server redetermines a configuration parameter based on the game running data in the exception message, that is, performs step S33.

Figure 5A:
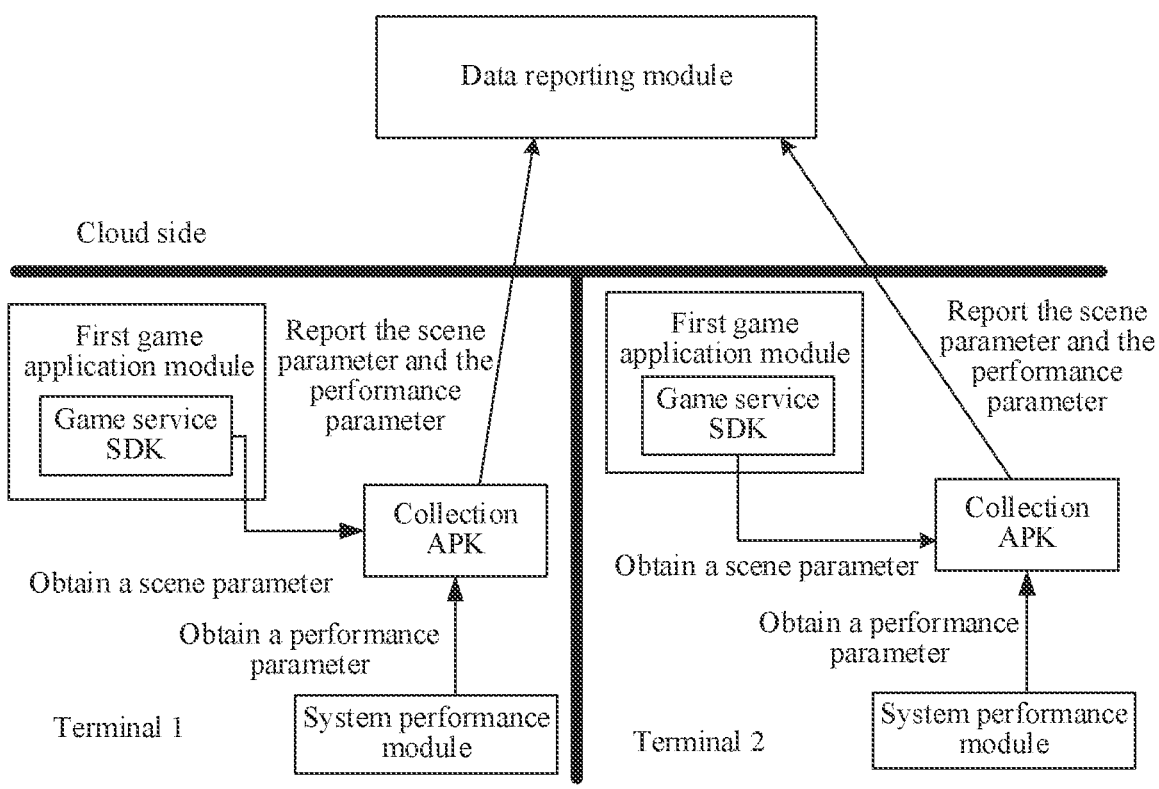
FIG. 5A is a schematic diagram of a system architecture according to an embodiment of this application.

For example, FIG. 5A shows an example of a software architecture of a communication system. As shown in FIG. 5A, the system architecture includes a cloud side and a terminal side (in FIG. 5A, a terminal 1 and a terminal 2 are used as an example, and models of the terminal 1 and the terminal 2 are the same). In this example, a plurality of terminals of a same model report game running data in a running process of the first game application to the cloud side. The cloud side includes a data reporting module, and the terminal side includes a first game application module, a collection APK, and a system performance module.

The first game application module may perform S42, S44, and the like in the embodiment shown in FIG. 4, and is configured to run the first game application. The first game application module is integrated with a game service SDK, may perform S31 and the like in the embodiment shown in FIG. 3, and is configured to: collect a scene parameter generated when the first game application module runs the first scene of the first game application, and send the scene parameter to the collection APK.

The system performance module may perform S31 and the like in the embodiment shown in FIG. 3, and is configured to: collect a performance parameter generated when the first game application module runs the first scene of the first game application, and send the performance parameter to the collection APK.

The collection APK may perform S31, S32, and the like in the embodiment shown in FIG. 3, and is configured to: obtain the scene parameter and the performance parameter that are generated when the first game application module runs the first scene of the first game application, and report the collected scene parameter and performance parameter to the cloud side.

The data reporting module may perform S32 and the like in the embodiment shown in FIG. 3, and is configured to: collect game running data sent by the terminal, and perform warehousing and the like.

In the scenario shown in FIG. 5A, the data reporting module on the cloud side may collect game running data in a process of running the first game application on a plurality of terminals of a same model. The game running data may be game running data collected in the open beta test phase, or game running data collected in the official release phase, or game running data collected in the open beta test phase and the official release phase. For example, before the first game application is released, the data reporting module may be understood as an open beta test big data module, and is configured to: collect game running data generated when a plurality of terminals of a same model run the first scene of the first game application in the open beta test phase. After the first game application is released, the data reporting module may be understood as an official release big data module, and is configured to collect game running data generated when a plurality of terminals of a same model run the first scene of the first game application in the official release phase.

Figure 5B:
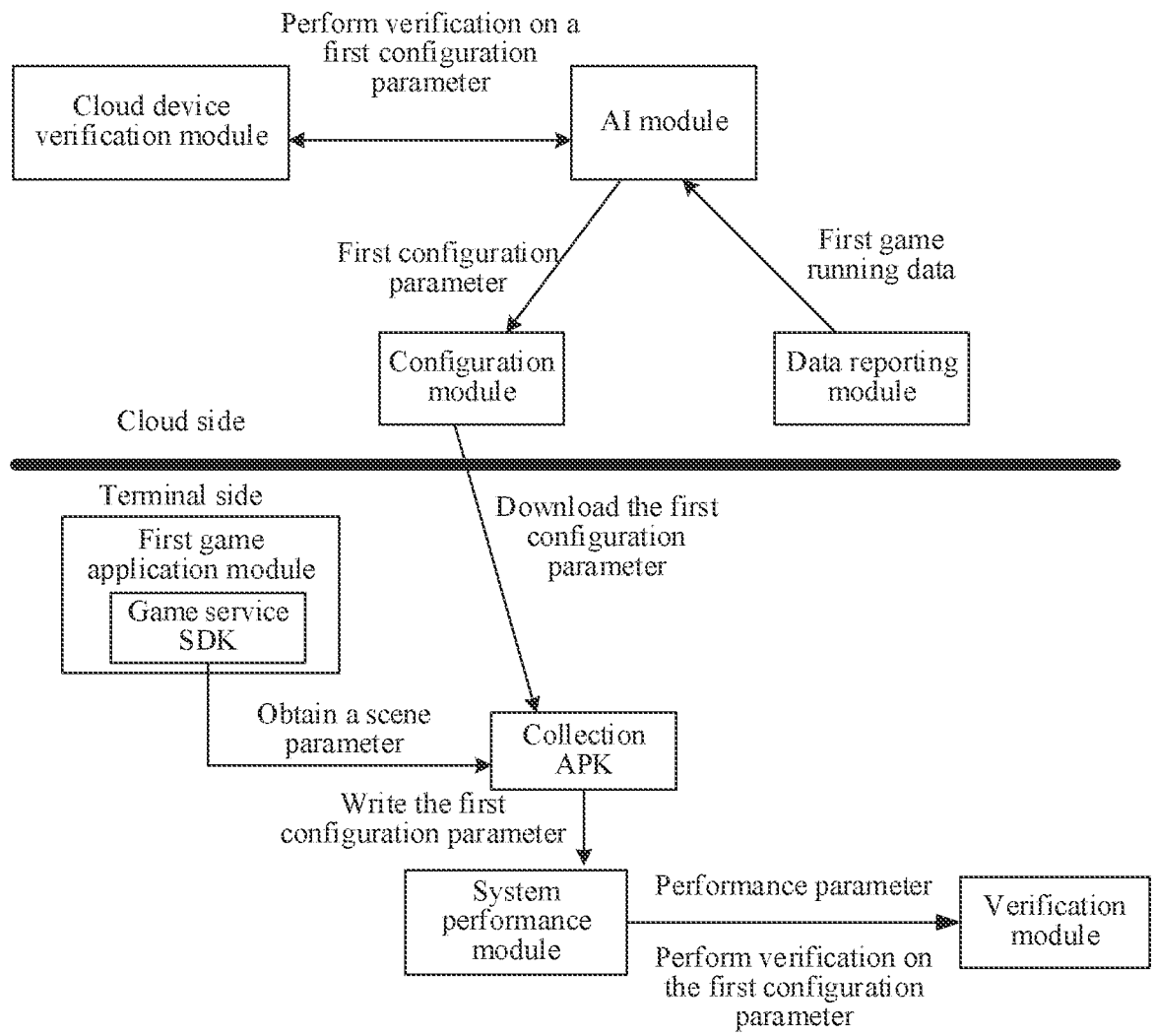
FIG. 5B is a schematic diagram of another system architecture according to an embodiment of this application.

For example, FIG. 5B shows another example of a software architecture of a communication system. As shown in FIG. 5B, the system architecture includes a cloud side and a terminal side. In this example, the terminal side obtains the first configuration parameter on the cloud side, and performs verification on the first configuration parameter in a running process of the first game application.

The cloud side includes a data reporting module, an artificial intelligence (artificial intelligence, AI) module, a cloud device module, and a configuration module. For a specific implementation process of the data reporting module, refer to the description in FIG. 5A. Details are not described herein again.

The AI module may perform S33, S34, and the like in the embodiment shown in FIG. 3, and is configured to: obtain game running data of the first game application from the data reporting module, train the first parameter recommendation model based on the game running data, and obtain the first configuration parameter according to the trained first parameter recommendation model. The game running data may be game running data in the open beta test phase, or game running data in the official release phase, or game running data in the open beta test phase and the official release phase. For example, before the first game application is released, the game running data is game running data in the open beta test phase. After the first game application is released, the game running data may be game running data in the official release phase, or game running data in the official release phase and the open beta test phase.

The cloud device module may perform S35 and the like in the embodiment shown in FIG. 3, and is configured to perform verification on the first configuration parameter based on the third performance parameter and the fourth performance parameter.

The configuration module may perform S41 and the like in the embodiment shown in FIG. 4, and is configured to send the verified configuration parameter in the cloud device module to the terminal.

The terminal side includes a first game application module, a collection APK, a system performance module, and a verification module. For implementation processes of the first game application module, the collection APK, and the system performance module, refer to the description in FIG. 5A. Details are not described herein again.

The collection APK may further perform S41 and the like in the embodiment shown in FIG. 4, and is configured to obtain a configuration parameter from the cloud side. For example, the collection APK actively sends a request message for obtaining the first configuration parameter to the configuration module, and receives the first configuration parameter from the configuration module; or the collection APK passively receives the first configuration parameter pushed by the configuration module. For example, in the open beta test phase, the configuration module may actively push the first configuration parameter to the collection APK based on the identification information of the terminal.

The system performance module is configured to write the first configuration parameter into a corresponding performance component, to configure a software resource and/or a hardware resource of the terminal, for example, perform S42, S44, and the like in the embodiment shown in FIG. 4.

The verification module may perform S43 and the like in the embodiment shown in FIG. 4, and is configured to: perform verification on the first configuration parameter recommended by the cloud side, and feed back a verification result to the system performance module. For example, if the verification fails, the system performance module writes the second configuration parameter into a corresponding performance component, to run the first scene of the first game application based on the second configuration parameter; otherwise, the system performance module continues running the first scene of the first game application based on the first configuration parameter.

Figure 6A:
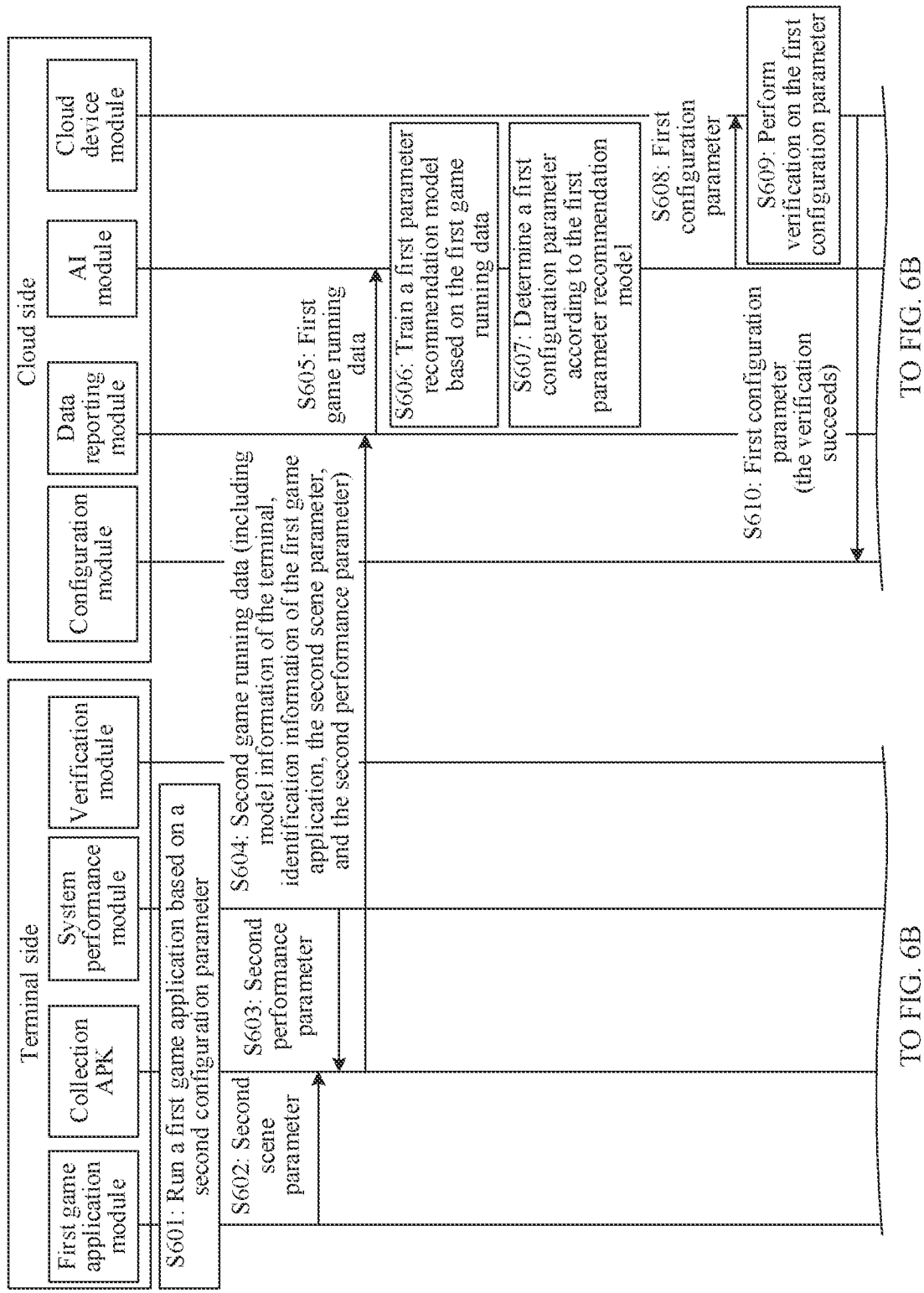
FIG. 6A and FIG. 6B are another schematic flowchart of a performance optimization method according to an embodiment of this application.
Figure 6B:
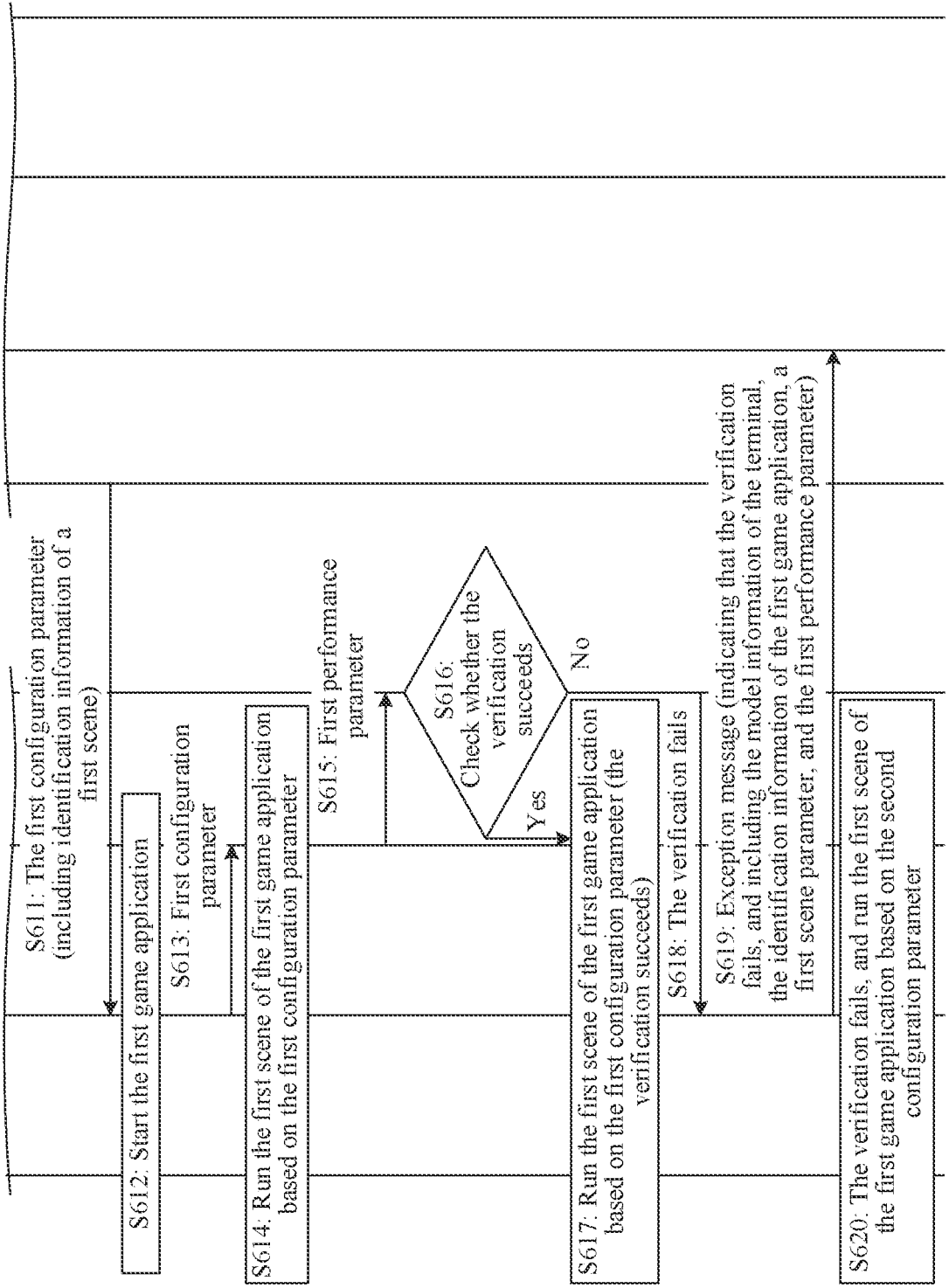

With reference to the system architectures shown in FIG. 5A and FIG. 5B, the following describes a performance optimization method provided in embodiments of this application. FIG. 6A and FIG. 6B are a schematic flowchart of a performance optimization method according to an embodiment of this application.

S601: A terminal runs a first game application based on a second configuration parameter. A model of the terminal is a first model.

For example, the terminal may run a first scene of the first game application based on the second configuration parameter. For description of the second configuration parameter, refer to the description of the second configuration parameter in step S31. Details are not described herein again.

S602: A first game application module sends a second scene parameter to a collection APK. Correspondingly, the collection APK receives the second scene parameter.

In a running process of the first game application, a game service SDK integrated into the first game application module may identify a high-load scene (that is, the first scene) in the running process of the first game application, collect a scene parameter in the high-load scene, and then send the collected scene parameter to the collection APK. The second scene parameter may include one or more of a high-load scene entry/exit identifier, a scene type, or instance data. For a specific implementation of step S602, refer to the content described in step S31 in FIG. 3. Details are not described herein again.

S603: A system performance module sends a second performance parameter to the collection APK. Correspondingly, the collection APK receives the second performance parameter.

In the running process of the first game application, the collection APK may obtain the second performance parameter by using the system performance module based on the second scene parameter reported by the SDK, for example, the high-load scene entry/exit identifier. The second performance parameter may include one or more of rendering duration of the first frame, an average frame rate, a jitter rate, a low frame rate ratio, power consumption, a device housing temperature, or a quantity of lost frames. For a specific implementation of step S603, refer to the content described in step S31 in FIG. 3. Details are not described herein again.

S604: The collection APK sends second game running data to a cloud server. A data reporting module in the cloud server receives the first game running data.

The second game running data includes model information of the terminal, identification information of the first application, the second scene parameter, and the second performance parameter. Optionally, the second game running data may further include identification information of the terminal. For a specific implementation of step S604, refer to the content described in step S32 in FIG. 3. Details are not described herein again.

Through step S601 to step S604, the data reporting module may collect the second game running data from a plurality of terminals of a same model, and the second game running data is denoted as first game running data. The first game running data includes the second game running data.

S605: The data reporting module sends the first game running data to an AI module. Correspondingly, the AI module receives the first game running data.

For example, the data reporting module may periodically (for example, weekly, monthly, or the like) send obtained game running data to the AI module, or the data reporting module may aperiodically send obtained game running data to the AI module. For example, when an amount of the obtained game running data reaches a specified threshold (for example, 1000 pieces of second game running data), the data reporting module sends the obtained game running data to the AI module. For another example, when a ratio of a quantity of terminals that send the second game running data to a quantity of terminals of the first model on which the first game application is currently installed reaches a specified ratio (for example, 10%, 15%, or the like), the data reporting module sends the obtained game running data to the AI module.

S606: The AI module trains a first parameter recommendation model based on the first game running data.

For example, the AI module may construct a training sample based on the first game running data, and train the first parameter recommendation model based on the training sample. For a specific implementation of step S606, refer to the content described in step S33 in FIG. 3. Details are not described herein again.

S607: The AI module obtains a first configuration parameter according to the first parameter recommendation model.

For example, the AI module may input the model information of the terminal and the identification information of the first game application into the first parameter recommendation model, to obtain the first configuration parameter. The first configuration parameter may include but is not limited to one or more of the following parameters: a running frequency of CPU, a running frequency of a GPU, quantities of big cores and small cores of the CPU, a GPU size, a highest temperature for triggering a temperature control policy, a network speed priority, or the like. For a specific implementation of step S607, refer to the content described in step S34 in FIG. 3. Details are not described herein again.

S608: The AI module sends the first configuration parameter to a cloud device module. Correspondingly, the cloud device module receives the first configuration parameter.

S609: The AI module performs verification on the first configuration parameter.

The AI module may perform verification on the first configuration parameter based on a third performance parameter and a fourth performance parameter. For a specific implementation of step S609, refer to the content described in step S35 in FIG. 3. Details are not described herein again. If the verification fails, the cloud device module may send, to the AI module, a message indicating that the verification fails, so that the AI module retrains the first parameter configuration module, that is, repeatedly performs content of step S606 to step S609. If the verification succeeds, the cloud device module may send the first configuration parameter to a configuration module.

S610: The cloud device module sends the first configuration parameter to the configuration module. Correspondingly, the configuration module receives the first configuration parameter. After receiving the first configuration parameter, the configuration module may update a configuration parameter, for example, delete a local third configuration parameter, and store the first configuration parameter.

For example, after receiving the first configuration parameter, the configuration module may actively push the first configuration parameter to one or more terminals of the first model on which the first game application is installed, so that after starting the first game application next time, the one or more terminals may run the first game application based on the first configuration parameter.

Alternatively, the configuration module may not actively push the first configuration parameter to the terminal. For example, when the terminal starts the first game application, the collection APK may actively request to obtain the first configuration parameter from the configuration module. For example, the collection APK sends a first request message to the configuration module, and the first request message includes the model information of the terminal and the identification information of the first game application. The configuration module sends a first response message to the collection APK, and the first response message includes the first configuration parameter.

For a specific implementation of step S610, refer to the content described in step S41 in FIG. 4. Details are not described herein again. In this example, an example in which the configuration module actively recommends the first configuration parameter to the terminal is used for description.

S611: The configuration module sends the first configuration parameter to the collection APK.

The configuration module may push the first configuration parameter to collection APKs of one or more terminals. The first game application is installed on a plurality of terminals, and models of the plurality of terminals are all the first model. For example, the configuration model may determine the identification information of the terminal based on an internet access information of the terminal, and push the first configuration parameter to the terminal based on the identification information of the terminal. For another example, the configuration module may push the first configuration parameter to the terminal based on identification information of the terminal in game running data reported by the terminal in an open beta test phase. The first configuration parameter may include identification information of the first scene and one or more of the following parameters corresponding to the identification information of the first scene: a running frequency of CPU, a running frequency of a GPU, quantities of big cores and small cores of the CPU, a GPU size, a highest temperature for triggering a temperature control policy, a network speed priority, or the like.

S612: The terminal starts the first game application.

S613: The collection APK sends the first configuration parameter to the system performance module. Correspondingly, the system performance module receives the first configuration parameter.

After receiving the first configuration parameter, the collection APK sends the first configuration parameter to the system performance module. The system performance module may configure, based on the first configuration parameter, a software resource that can be used by the first game application in the first scene in a running process of the first game application, or a hardware resource that can be used, or a software resource and a hardware resource that can be used, that is, write a parameter into a corresponding performance component of a system.

S614: The terminal runs the first scene of the first game application based on the first configuration parameter. For a specific implementation of step S613 and step S614, refer to the content described in step S42 in FIG. 4. Details are not described herein again.

S615: The system performance module sends a first performance parameter to a verification module. Correspondingly, the verification module receives the first performance parameter.

In a process of running the first game application based on the first configuration parameter, the system performance module may collect the first performance parameter in the first scene, and send the first performance parameter to the verification module. For example, the system performance module may determine the first performance parameter based on the high-load scene entry/exit identifier in the first scene parameter collected by the game service SDK. The first scene parameter is a scene parameter corresponding to the first scene in the process of running the first game application based on the first configuration parameter.

S616: The verification module checks whether the verification on the first configuration parameter succeeds. If the verification performed by the verification module on the first configuration parameter succeeds, content shown in step S617 is performed to continue running the first game application based on the first configuration parameter: otherwise, content shown in steps S617 to S619 is performed.

For a specific implementation of step S616, refer to the content described in step S43 in FIG. 4. Details are not described herein again.

S617: The terminal continues running the first scene of the first game application based on the first configuration parameter.

Optionally, the terminal may delete the local second configuration parameter, to improve storage resource utilization.

S618: The verification module sends a verification failure message to the collection APK. Correspondingly, the collection APK receives the verification failure message.

S619: The collection APK sends an exception message to the data reporting module. Correspondingly, the data reporting module receives the exception message.

The exception message includes the model information of the terminal, the identification information of the first game application, the first scene parameter, and the first performance parameter. Specifically, when the verification fails, the collection APK may collect the first scene parameter and the first performance parameter that are generated when the first scene of the first game application is run based on the first configuration parameter, and send the collected first scene parameter and first performance parameter to the data reporting module. For a specific implementation of step 619, refer to the content described in step S45 in FIG. 4. Details are not described herein again.

S620: The terminal runs the first scene of the first game application based on the second configuration parameter.

When the verification fails, the terminal runs the first game application based on the second configuration parameter. For a specific implementation of step 620, refer to the content described in step S44 in FIG. 4. Details are not described herein again.

It may be understood that an execution sequence of the steps in FIG. 6A and FIG. 6B is merely an example, and is not limited in this embodiment of this application. For example, the collection APK may first obtain the second scene parameter, and then obtain the second performance parameter, or may simultaneously obtain the second scene parameter and the second performance parameter. For another example, when the terminal starts the first game application, the collection APK is triggered to obtain the first configuration parameter. Alternatively, after obtaining the first configuration parameter, the configuration module may actively send the first configuration parameter to the collection APK. For another example, when the verification fails, the terminal may first send the exception message to the data reporting module, and then run the first game application based on the second configuration parameter; or may run the first game application based on the second configuration parameter while sending the exception message to the data reporting module.

Figure 7A:
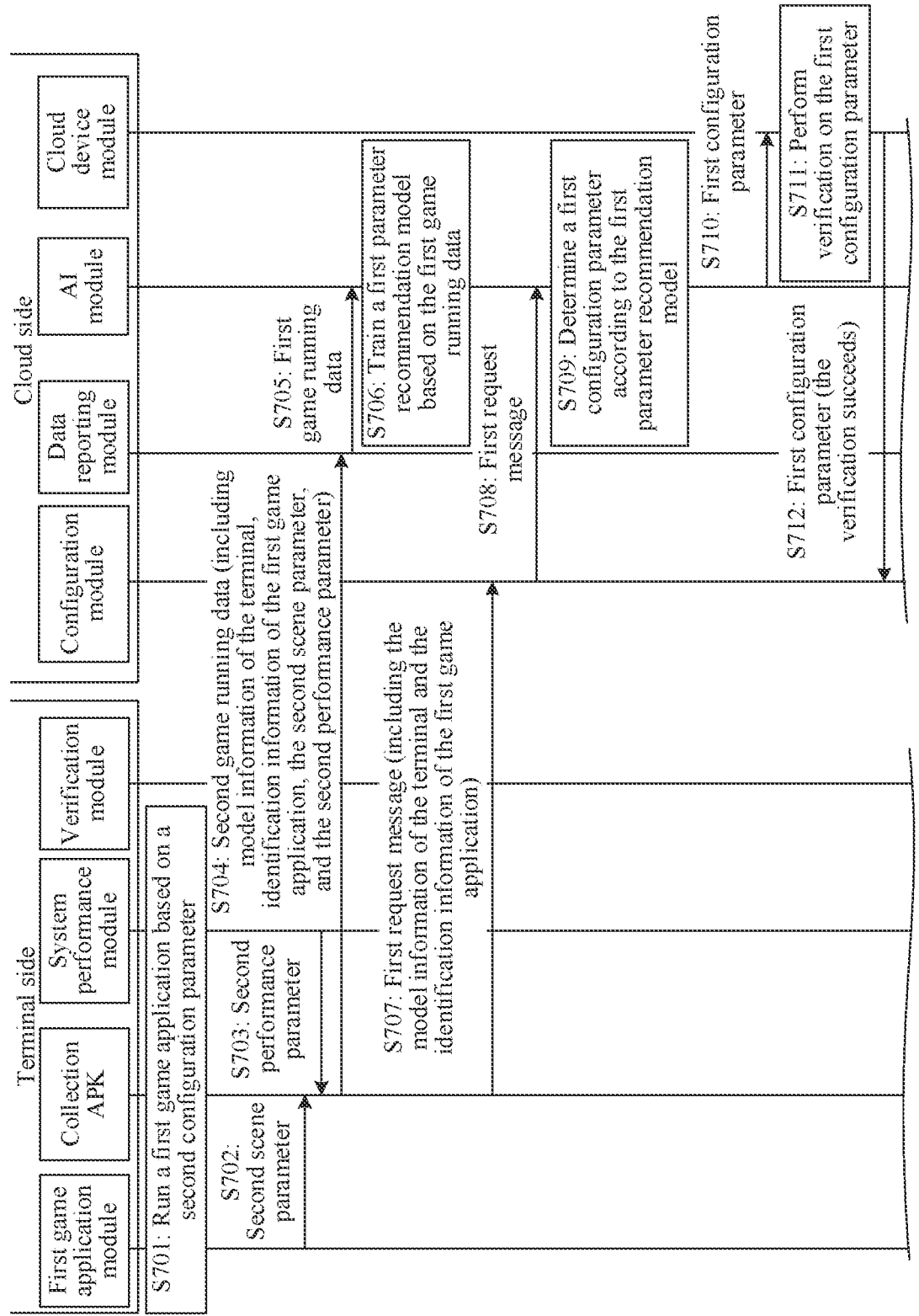
FIG. 7A and FIG. 7B are still another schematic flowchart of a performance optimization method according to an embodiment of this application.
Figure 7B:
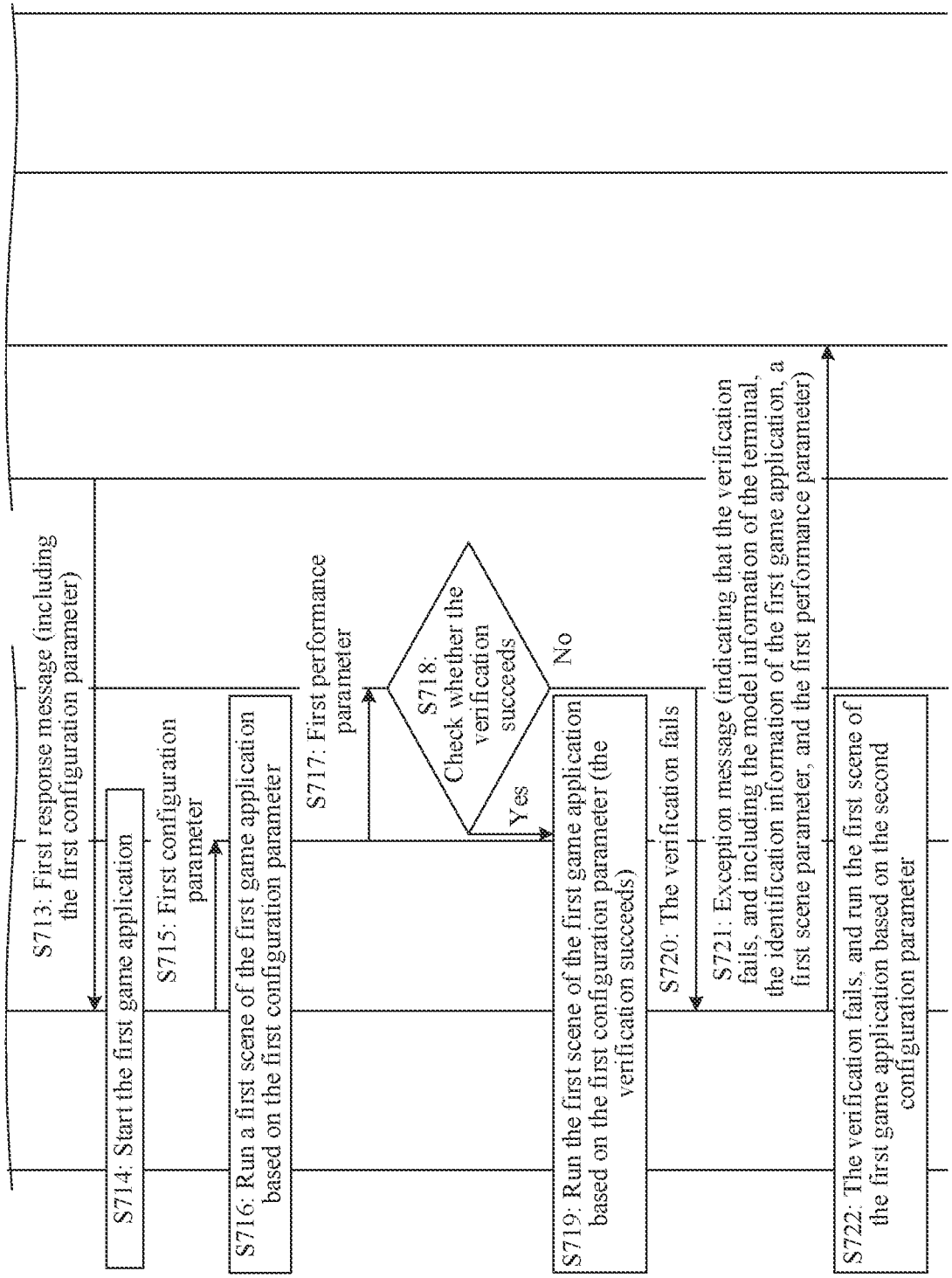

FIG. 7A and FIG. 7B are another schematic flowchart of a performance optimization method according to an embodiment of this application. In this example, a terminal triggers a server to obtain a first configuration parameter. Steps S701 to S706, S710 to S712, and S714 to S722 are respectively the same as steps S601 to S606, S608 to S610, and S612 to S620 in the embodiment shown in FIG. 6A and FIG. 6B. A difference lies in that:

S707: The collection APK sends a first request message to the configuration module. Correspondingly, the configuration module receives the first request message.

The first request message includes model information of the terminal and the identification information of the first game application. The first request message is used to request to obtain a configuration parameter of the first game application. For example, the terminal may periodically (for example, weekly) send the first request message to the server, or may aperiodically send the first request message to the server, for example, send the first request message after a version of the first game application is updated.

S708: The configuration module forwards the first request message to the AI module. Correspondingly, the AI module receives the first request message.

S709: The AI module obtains the first configuration parameter according to the first parameter recommendation model.

After receiving the first request message, as a response, the AI module inputs the model information of the terminal and the identification information of the first game application into the first parameter recommendation model, to obtain the first configuration parameter.

S713: The configuration module sends a first response message to the collection module. Correspondingly, the collection module receives the first response message. The first response message includes the first configuration parameter.

It should be noted that, after the AI module obtains the first configuration parameter in response to the first request message, the cloud device module may perform verification on the first configuration parameter, and the verified configuration parameter is carried in the first response message and sent to the terminal. Alternatively, after the AI module obtains the first configuration parameter in response to the first request message, the first configuration parameter may be directly carried in the first response message and sent to the terminal device, so that duration of responding to the first request message by the cloud side can be reduced.

It may be understood that an execution sequence of the steps in FIG. 7A and FIG. 7B is merely an example, and is not limited in this embodiment of this application. For example, the collection APK may send the first request message to the cloud before the cloud obtains the first configuration parameter, or may send the first request message to the cloud after the first game application is started. Specifically, when the first game application is started, the collection APK sends the first request message to the configuration module on the cloud, that is, after step S714, the collection APK sends the first request message to the configuration module. Correspondingly, after receiving the first request message, the configuration module responds to the first request message, uses the first response message to carry the first configuration parameter, and sends the first response message to the collection APK Terms used in the foregoing embodiments are merely for a purpose of describing specific embodiments, but are not intended to limit this application.

According to the foregoing embodiments, this application further provides a computer storage medium. The computer storage medium stores a computer program, and when the computer program is executed by a computer, the computer is enabled to perform the application performance optimization method provided in the foregoing embodiments.

An embodiment of this application further provides a computer program product, including instructions. When the instructions are run on a computer, the computer is enabled to perform the application performance optimization method provided in the foregoing embodiments.

Embodiments of this application are described with reference to the flowcharts and/or block diagrams of the method, the device (system), and the computer program product according to embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

The foregoing embodiments are merely used to describe the technical solutions of this application in detail. The descriptions of the foregoing embodiments are merely intended to help understand the methods according to embodiments of the present invention, and shall not be construed as any limitation on embodiments of the present invention. Variations or replacements readily figured out by a person skilled in the art shall fall within the protection scope of embodiments of the present invention.

What is claimed is:

1. A method comprising:
receiving, by a server from a plurality of first terminals, first running data associated with the first terminals running a first scene of a first application, wherein the first terminals have a first model, and wherein the first running data comprises:
the first model;
the identification information of the first application;
a scene parameter comprising one or more of a first scene entry/exit identifier, a scene type, or instance data; and
a performance parameter comprising one or more of a rendering duration of a first frame, an average frame rate, a jitter rate, a low frame rate ratio, power consumption, a device housing temperature, or a quantity of lost frames;
determining, by the server based on the first model, the identification information, and the first running data, a first configuration parameter to perform parameter configuration on a second terminal that is of the first model and that runs the first scene, wherein the first configuration parameter corresponds to the first scene;
sending, by the server to the second terminal, the first configuration parameter;
receiving, by the second terminal from the server, the first configuration parameter;
determining, by the second terminal, the first scene during running of the first application; and
running, by the second terminal based on the first configuration parameter, the first scene.

2. The method of claim 1, further comprising:
performing, by the second terminal, verification on the first configuration parameter;
running, by the second terminal based on a second configuration parameter, the first scene when the verification on the first configuration parameter has failed; and
continuing running, by the second terminal based on the first configuration parameter, the first scene when the verification on the first configuration parameter has succeeded.

3. The method of claim 2, further comprising:
   identifying, by the second terminal, that the verification on the first configuration parameter has failed; and
   sending, by the second terminal, in response to identifying that the verification on the first configuration parameter has failed, and to the server, an exception message.

4. The method of claim 1, wherein before sending the first configuration parameter, the method further comprises:
   sending, by the second terminal to the server, a first request message comprising the first model and the identification information, wherein the first request message requests to obtain the first configuration parameter; and
   receiving, by the server from the second terminal, the first request message.

5. The method of claim 1, wherein before receiving the first configuration parameter, the method further comprises:
   running, by the second terminal based on a second configuration parameter, the first scene;
   obtaining, by the second terminal, second running data generated when the second terminal runs the first scene based on the second configuration parameter, wherein the first running data comprises the second running data; and
   sending, by the second terminal to the server, the second running data.

6. The method of claim 1, further comprising:
   training, based on the first model, the identification information, and the first running data, a first parameter recommendation model; and
   obtaining, based on the first model, the identification information, and the first parameter recommendation model, the first configuration parameter.

7. A method implemented by a first terminal that has a first model, wherein the method comprises:
   receiving, from a server, a first configuration parameter for configuring the first terminal when the first terminal runs a first scene of a first application, wherein the first configuration parameter is based on the first model, identification information of the first application, and first running data, and wherein the first running data comprises:
      the first model;
      the identification information;
      a scene parameter comprising one or more of a first scene entry/exit identifier, a scene type, or instance data; and
      a performance parameter comprising one or more of a rendering duration of a first frame, an average frame rate, a jitter rate, a low frame rate ratio, power consumption, a device housing temperature, or a quantity of lost frames, wherein the first running data is generated when a plurality of second terminals that are of the first model run the first scene, and wherein the first configuration parameter corresponds to the first scene;
   determining the first scene during running of the first application; and
   running, based on the first configuration parameter, the first scene.

8. The method of claim 7, wherein the first scene is a high-load scene in a running process of the first application.

9. The method of claim 7, further comprising:
   performing verification on the first configuration parameter;
   running, based on a second configuration parameter, the first scene when the verification on the first configuration parameter has failed; and
   continuing running, based on the first configuration parameter, the first scene when the verification on the first configuration parameter has succeeded.

10. The method of claim 9, wherein performing the verification on the first configuration parameter comprises:
    collecting, based on the first configuration parameter, a first performance parameter generated during running of the first scene; and
    performing, based on a second performance parameter and the first performance parameter, verification on the first configuration parameter, wherein the second performance parameter is generated when the first terminal runs the first scene based on the second configuration parameter.

11. The method of claim 7, wherein before receiving the first configuration parameter, the method further comprises:
    running, based on a second configuration parameter, the first scene;
    obtaining second running data generated when the first terminal runs the first scene based on the second configuration parameter; and
    sending, to the server, the second running data.

12. The method of claim 7, wherein before receiving the first configuration parameter, the method further comprises sending, to the server, a first request message comprising the first model and the identification information, and wherein the first request message requests to obtain the first configuration parameter.

13. The method of claim 7, wherein the first configuration parameter comprises second identification information of the first scene and one or more of the following parameters corresponding to the second identification information:
    a first running frequency of a central processing unit (CPU);
    a second running frequency of a graphics processing unit (GPU);
    quantities of big cores and small cores of the CPU;
    a GPU size;
    a highest temperature for triggering a temperature control policy; or
    a network speed priority.

14. A method implemented by a server, wherein the method comprises:
    receiving, from a plurality of first terminals having a first model, first running data generated when the first terminals run a first scene of a first application;
    training, based on the first model, the identification information, and the first running data, a first parameter recommendation model;
    obtaining, based on the first model, the identification information, and the first parameter recommendation model, a first configuration parameter corresponding to the first scene;
    determining, based on the first model, identification information of the first application, and the first running data, the first configuration parameter to perform parameter configuration on a second terminal having the first model when the second terminal runs the first scene; and
    sending, to the second terminal, the first configuration parameter.

15. The method of claim 14, wherein before sending the first configuration parameter, the method further comprises:

performing verification on the first configuration parameter; and determining that the verification on the first configuration parameter has succeeded.

16. The method of claim 15, wherein performing the verification on the first configuration parameter comprises:

running, based on the first configuration parameter by simulating a third terminal of the first model, the first scene;

collecting a first performance parameter generated during running of the first scene based on the first configuration parameter; and performing, on the first configuration parameter based on a second performance parameter and the first performance parameter, verification, wherein the second performance parameter is generated during running of the first scene based on a second configuration parameter.

17. The method of claim 14, wherein before sending the first configuration parameter, the method further comprises receiving, from the first terminal, a first request message comprising the first model and the identification information, and wherein the first request message requests to obtain the first configuration parameter.

18. The method of claim 14, wherein the first configuration parameter comprises second identification information of the first scene and one or more of the following parameters corresponding to the second identification information:

a first running frequency of a central processing unit (CPU);

a second running frequency of a graphics processing unit (GPU);

quantities of big cores and small cores of the CPU;

a GPU size;

a highest temperature for triggering a temperature control policy; or a network speed priority.

19. The method of claim 14, wherein the first running data comprises:

the first model;

the identification information;

a scene parameter comprising one or more of a first scene entry/exit identifier, a scene type, or instance data; and a performance parameter comprising one or more of: a rendering duration of a first frame, an average frame rate, a jitter rate, a low frame rate ratio, power consumption, a device housing temperature, or a quantity of lost frames.

20. The method of claim 14, wherein the first running data comprises:

the first model;

the identification information;

a scene parameter comprising one or more of a first scene entry/exit identifier, a scene type, or instance data; and a performance parameter comprising one or more of: a rendering duration of a first frame, an average frame rate, a jitter rate, a low frame rate ratio, power consumption, a device housing temperature, or a quantity of lost frames.

\* \* \* \* \*